(12) United States Patent
Smith et al.

(10) Patent No.: US 12,514,178 B2
(45) Date of Patent: Jan. 6, 2026

(54) AUTOMATED HYDROPONIC GROWING APPLIANCE

(71) Applicant: Babylon Micro-Farms, Inc., Richmond, VA (US)

(72) Inventors: Graham Smith, Richmond, VA (US); Marc Oosterhuis, Richmond, VA (US); Alexander Olesen, Richmond, VA (US)

(73) Assignee: Babylon Micro-Farms, Inc., Richmond, VA (US)

( * ) Notice: Subject to any disclaimer, the term of this patent is extended or adjusted under 35 U.S.C. 154(b) by 0 days.

(21) Appl. No.: 18/428,683

(22) Filed: Jan. 31, 2024

(65) Prior Publication Data

US 2024/0172613 A1    May 30, 2024

Related U.S. Application Data

(63) Continuation-in-part of application No. 16/927,846, filed on Jul. 13, 2020, now Pat. No. 11,930,746, which is a continuation of application No. 16/100,795, filed on Aug. 10, 2018, now Pat. No. 10,750,689.

(60) Provisional application No. 62/555,777, filed on Sep. 8, 2017.

(51) Int. Cl.
*A01G 31/02*    (2006.01)
*A01G 27/00*    (2006.01)
*A01G 31/06*    (2006.01)

(52) U.S. Cl.
CPC ........... *A01G 31/02* (2013.01); *A01G 27/001* (2013.01); *A01G 27/003* (2013.01); *A01G 31/06* (2013.01); *A01G 31/065* (2025.01)

(58) Field of Classification Search
CPC .... A01G 31/02; A01G 27/001; A01G 27/003; A01G 31/06; A01G 31/065; A01G 31/008; A01G 31/025; A01G 31/011
See application file for complete search history.

(56) References Cited

U.S. PATENT DOCUMENTS

| | | | |
|---|---|---|---|
| 10,136,587 B1 * | 11/2018 | Johnson | A01G 25/165 |
| 2017/0027112 A1 * | 2/2017 | Vail | A01G 9/247 |
| 2017/0035002 A1 * | 2/2017 | Ellins | A01G 31/02 |
| 2017/0094920 A1 * | 4/2017 | Ellins | A01H 4/001 |
| 2020/0260653 A1 * | 8/2020 | Douglas | A01G 7/02 |

* cited by examiner

*Primary Examiner* — Trinh T Nguyen
(74) *Attorney, Agent, or Firm* — Woods Rogers PLC; Timothy J. Bechen; Nathan Evans

(57) ABSTRACT

A hydroponic growing method and systems includes receiving sensor data from a plurality of sensors disposed about or around the growing system and comparing the sensor data against standard operating data protocols for operating conditions within the growing system. The growing method and system further detects if an operational risk exists based on the comparison of the sensor data and if the operational safety risk is detected, modify at least one of the plurality of growing components. The growing system may include a cabinet structure along with one or more processing devices.

10 Claims, 16 Drawing Sheets

- Guided Growing Experience
  8010

- Remote Crop Monitoring
  8020

- Live Plant Growth Analytics
  8030

- Recipe Suggestions
  8040

- Re-stock Plants Instantly
  8050

11030

AUTOMATED HYDROPONIC GROWING APPLIANCE

CROSS-REFERENCE TO RELATED APPLICATIONS

The present application is a continuation-in-part of U.S. patent application Ser. No. 16/927,846 filed Jul. 13, 2020, now issued U.S. Pat. No. 11,930,746, which is a continuation of and relies on the disclosures of and claims priority to and the benefit of the filing dates of U.S. patent application Ser. No. 16/100,795, filed Aug. 10, 2018, now U.S. Pat. No. 10,750,689, which claims priority to and the benefit of U.S. Provisional Application No. 62/555,777 filed Sep. 8, 2017. The disclosures of those applications are hereby incorporated by reference herein in their entireties.

BACKGROUND OF THE INVENTION

Field of Invention

The present invention is directed in general aspects to the intersection of hydroponic plant cultivation, urban farming, indoor gardening, and consumer electronics. In a preferred embodiment, the current invention provides for devices, apparatus, and related methods, which allow users to grow a wide variety of crops in a plug-and-play, dynamic feedback control hydroponic system utilizing a novel technology platform requiring relatively little maintenance compared to prior art systems, in aspects, other than introducing pre-seeded growing trays and then harvesting. The invention, in aspects, enables users that have little or almost no experience with crop cultivation to grow sufficient or desired yields of crops in a small area, regardless of the environment. This novel hydroponic system incorporates innovative technology that, in part, automatically regulates the environment of the compact growing system depending on feedback from sensors detecting real-time growing conditions at the crop, pre-seeded tray, in a mixing apparatus, in a reservoir, or based on overall system levels.

Description of Related Art

The hydroponic method of cultivating plants involves growing plants in a soilless culture, environment, or medium. In order to achieve sufficient yield without soil, hydroponic cultivation uses a liquid solution comprising water and various nutrients. In most cases, this method allows plants to grow faster, healthier, and more disease- and pest-free than when growing in soil.

There are six basic categories of hydroponic systems: Wick, Raft (also called Water Culture), Ebb and Flow (also called Flood & Drain), Drip, Nutrient Film Technique, and Aeroponic. These basic system categories include multiple variations, and almost all hydroponic systems are a variation or combination of these types of systems.

Optimal plant growth depends on, among other things, a proper balance of light, water, nutrients, carbon dioxide, humidity, temperature, and time, and the most effective hydroponic cultivation is dependent on careful regulation of these several factors. The problems with most prior art consumer-focused hydroponic systems are based on the complexities of system components, a requirement for highly technical measurements, onerous maintenance, versatility, complicated design, or some combination of these elements. (On the other hand, relatively unsophisticated technology incapable of performing the functionality of the current invention is another drawback to currently available systems.) Moreover, most commercially available systems require an extensive list of components sourced from multiple retailers. This provides a challenge for consumers, and therefore a bather to entry, due to the extensive set-up time and lack of clarity surrounding what components are best suited to an individual's growing needs or desires. The current invention provides a plug-and-play growing apparatus, which simplifies the system and process, while still providing for sufficient or enhanced crop yield. Additionally, the current invention provides for, in preferred embodiments, a single "doser," sometimes referred to herein as a "multi-doser," "mixing chamber," "dosing chamber," or some variant thereof, which is capable of dosing a plurality of plants, growing areas, and/or reservoirs with proper amounts of water and nutrients, whereas the prior art teaches dosers that service only a single growing area, such as a single tray, pod, plant, or reservoir. Consequently, the present invention allows, for example, a user to introduce a pre-seeded growing pod, tray, table, or shelf, and the system will take care of managing the plant growth lifecycle, in part based on the particular growing conditions present for that plant, which the system will continually or periodically maintain at optimal, near-optimal, pre-determined, and/or desired conditions.

More specifically, the measuring of pH, electrical conductivity, temperature, and other variables often require individual devices to take time consuming and complex readings. These readings require scientific knowledge that makes hydroponics inaccessible to most consumers, which is resolved by the present invention. Moreover, most consumer hydroponics systems are limited in what they can grow; for example, they tend to be specialized for one crop type, or too small to accommodate larger plants. Current hydroponic systems also require users to select different growth mediums to fit plastic mesh cups and then plant seeds separately. As described herein, the current invention resolves such complications, especially for entry-level consumers, providing for a more user-friendly system allowing for more widespread use of hydroponics among both novice and experienced growers.

SUMMARY OF THE INVENTION

In one embodiment of the current invention, a computerized core control system comprising a processor is provided that automatically takes, monitors, and/or processes necessary readings and, based on those readings and relevant feedback, makes the necessary adjustments to ensure optimum, near optimum, and/or desired growing conditions without direct intervention required by the user. While the prior art requires maintenance of hydroponic systems depending on the technical measurements and therefore typically requires extensive day-to-day work for users, this invention removes or nearly removes the necessity for day-to-day maintenance by automatically adjusting growing conditions in real-or near real-time.

In a preferred embodiment, the system also comprises a multi-dosing device allowing for the maintenance of multiple nutrient reservoirs, using a single set of sensors and nutrient injectors associated with the multi-doser. The multi-doser, as taught herein, automates nutrient dosing and pH adjustment for multiple growing zones, including the ability to nourish different types of plants and/or at different stages of the plant life cycle, with, in one embodiment, a single multi-doser device for the overall system. Whereas in most automated dosing systems the sensors and dosers are located directly in the reservoirs that hold water, the current invention provides for, in a preferred embodiment, a single sensing and dosing chamber for the overall hydroponic system. For example, when a pH and nutrient content of a reservoir must be checked, the system pumps water or other liquid from that reservoir, or from a separate water or other liquid tank, into a common mixing chamber and back to its reservoir, where it is then pumped back to the plant. As it circulates, it immerses the sensors in the dosing or mixing chamber. Based on data recorded by the sensors, the device doses nutrient and pH solution directly into the mixing chamber. The circulation mixes the solution and the sensors monitor the water and instruct the pumps when the desired nutrient concentration or pH has been achieved. This process is repeated until the pH and nutrient concentration is in line with a pre-programmed growth recipe for a given reservoir. The system then circulates the solution from the next reservoir in the same fashion, sensing, mixing, and repeating until the values reach the growth recipe for that independent reservoir. The system cycles through and corrects or optimizes the reservoirs on a periodic basis; this process can be repeated as frequently as a user desires, or as determined by the processor, to maintain optimum, or near optimum, conditions within the nutrient solution for any given crop.

In another preferred embodiment, the multi-doser provides for a system allowing a feedback loop, whereby information about optimal growing conditions for the crop, coupled with information about the actual, real- or near real-time measurements of the crop's growing conditions, is used to instruct the multi-doser device, using sensors in the multi-doser, to mix a desired nutrient concentration and/or pH for the reservoir for that crop. The optimal growth recipe is then used to dose that particular crop. Information about that crop's growing conditions are periodically measured and the feedback loop of measuring growing conditions, mixing an optimal growth medium for the plant based on the growing conditions, and supplying the plant with the growth medium, continues until harvest. In certain embodiments, measured growing conditions data is sent to a core control system computing processor that compares the current growing conditions against optimal or desired growing conditions, and instructs the mixing chamber to mix a solution to send to the plant that will attempt to bring the growing conditions more closely in line with optimal or desired growing conditions according to the core control system.

This dynamic feedback control system allows for a single mixing/dosing chamber to supply more than one reservoir, which in turn means the overall system can more efficiently service more than one growing area, plant, plant type, pod, tray, table, or other apparatus containing plants. Therefore, a more compact, space-efficient, or resourceful system can be enabled, such as a cabinet containing growing trays or tables stacked vertically and/or horizontally, as shown in, for example, FIG. 9.

In another embodiment, the invention comprises an adjustable grow area that allows for smaller crops to be densely packed or, alternatively, for larger plants to be spaced out. As a result, the system allows for a more complete and versatile growing system enabling users to grow a wider variety of plant types without the need for changing the underlying growing apparatus. The system is designed to offer users a comprehensive, indoor growing appliance that has versatile growing capabilities and requires less maintenance than other consumer-level hydroponic systems.

This invention is also designed to simplify the growing process utilizing a more simple and functional home or home appliance. For example, the system comprises customized growing sheets or trays (or in some cases, pods) that are tailored to fit into the system, and these trays contain, in aspects, seeds and an inert growth medium. The trays simplify the growing process for users, allowing them to introduce trays of selected plant types or varying plant types and wait for harvest, while the system automatically compensates for differing growing needs of different trays so that plants with different nutrient requirements and other optimal growing conditions can grow in the same system, at the same time. In embodiments, the trays may be recognized by the system based on quick response codes (or QR codes), bar codes, or any other mechanism for recognizing an apparatus based on a predetermined code, pattern, or other passive or active communication method.

BRIEF DESCRIPTION OF THE DRAWINGS

The accompanying drawings illustrate certain aspects of embodiments of the present invention and should not be used to limit the invention. Together with the written description the drawings serve to explain certain principles of the invention.

namely, an embodiment of the basin combined with a component that holds the drain tube from the basin above.

Figure 16:
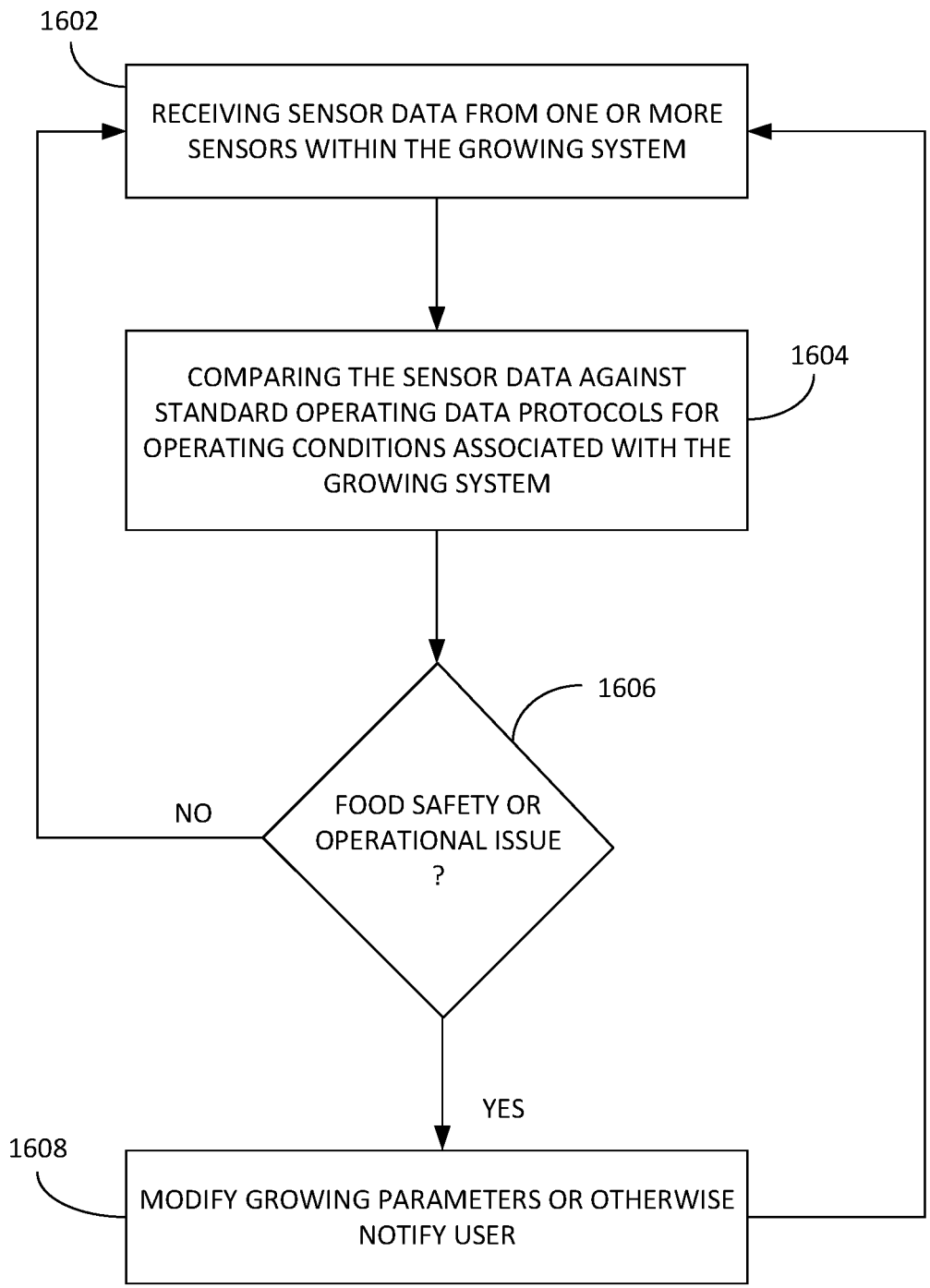

FIG. 16 is a flowchart of the steps of one embodiment of monitoring operations for food safety.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention. All references cited in this specification are hereby incorporated by reference in their entireties.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware. Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g. software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) (see, e.g., FIG. 8), which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

Figure 1:
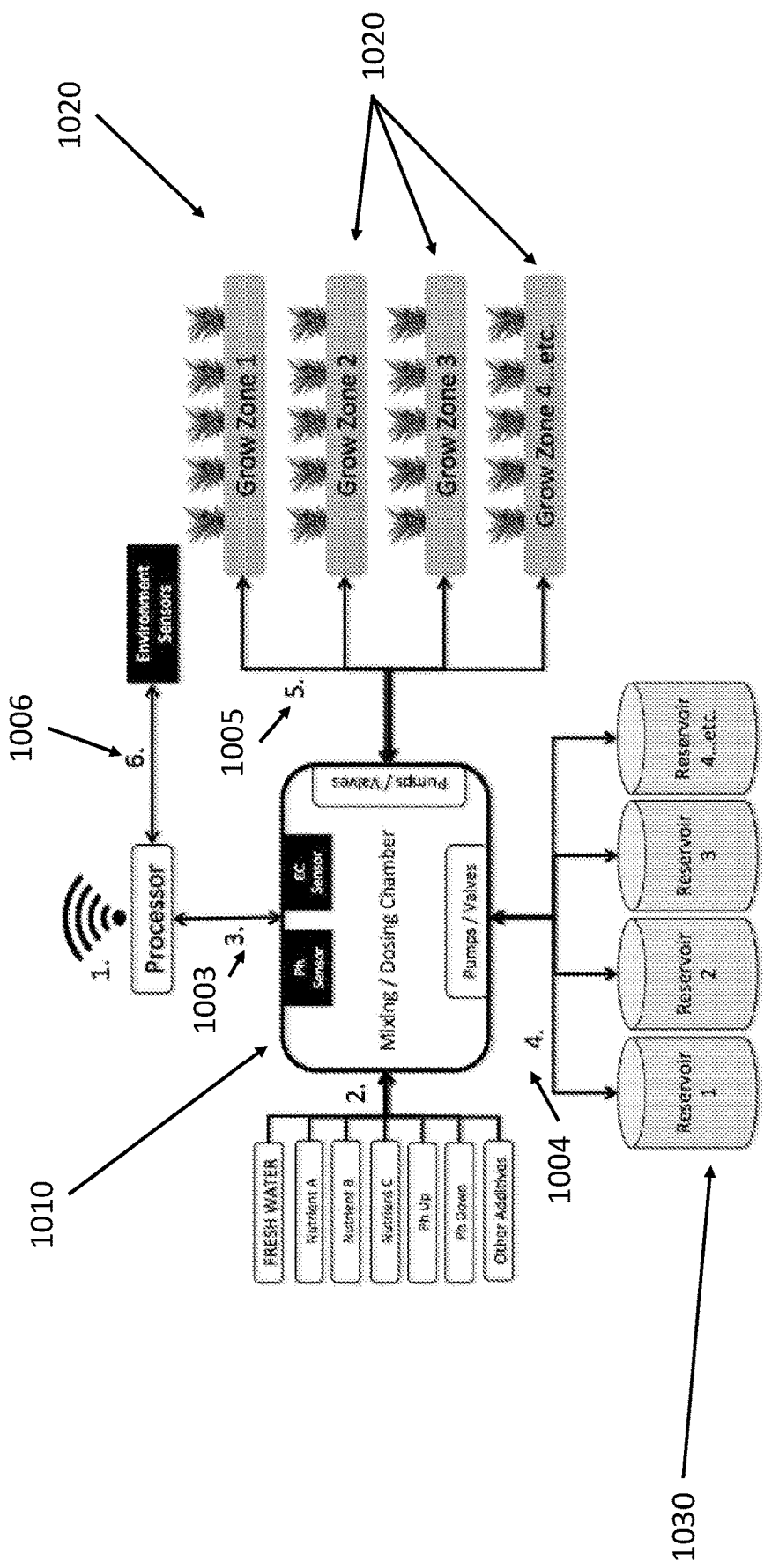
FIG. 1 is a schematic diagram of a depiction of one possible embodiment of the apparatus and system.

The invention described herein is an automated hydroponic growing apparatus to simplify the process of hydroponic farming, especially for consumers. For example, in FIG. 1, a processor receives information regarding the crop variety in Growing Zone One 1020. Fresh water, nutrients, and other additives best suited to the crop variety in Grow Zone One are added to the mixing chamber 1010. The mixing chamber senses the solution and sends information to the processor to determine whether the solution is optimized for the Crop Variety in Grow Zone One. The solution is pumped into Reservoir One 1030. The solution is circulated from Reservoir One to Grow Zone One. Environmental sensor readings are sent to the processor to better inform how to optimize the growing conditions for Grow Zone One. Regarding steps 3 1003, 4 1004, 5 1005, and 6 1006, they may be repeated constantly or periodically so that the crop variety in Grow Zone One has consistently optimized growing conditions. In aspects, the mixing chamber allows for this process to be repeated for Grow Zones 2, 3, 4, and so on 1025 without the need for any additional inputs or sensors, for example, in the mixing chamber.

Figure 2:
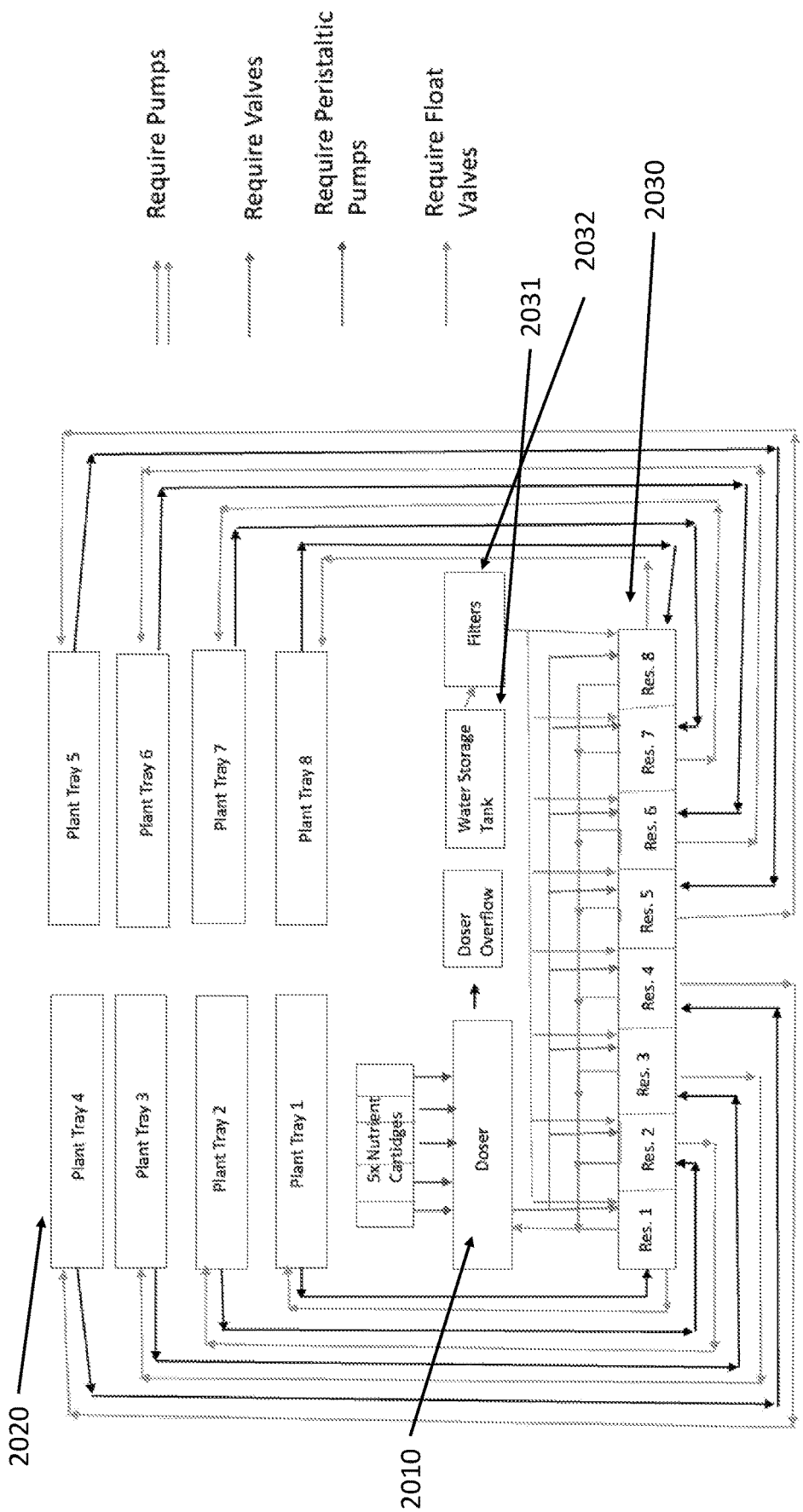
FIG. 2 is a schematic diagram of one possible embodiment of the apparatus and system.

Regarding FIG. 2, from the center of the figure, in this embodiment, a Water Storage 2031 tank circulates water through filters 2032 into a given reservoir 2030. Once each reservoir is filled with water, it is then circulated through the Doser 2010. The Doser is capable of sensing the water and adding nutrients and other additives to create a solution optimized for a specific plant type and its stage of growth. The adjusted water is circulated between its holding reservoir and its respective Plant Tray 2020. A computerized processor is capable of determining which plant type is in each Plant Tray, therefore, it instructs the Doser what needs to be in the optimized solution for that Plant Tray. The solution is routinely circulated through the Doser, sensed, and adjusted to ensure that conditions are optimized for a given plant type. This process is repeated for Plant Trays one through eight, for example, and could be expanded if more Plant Trays were added.

Figure 3:
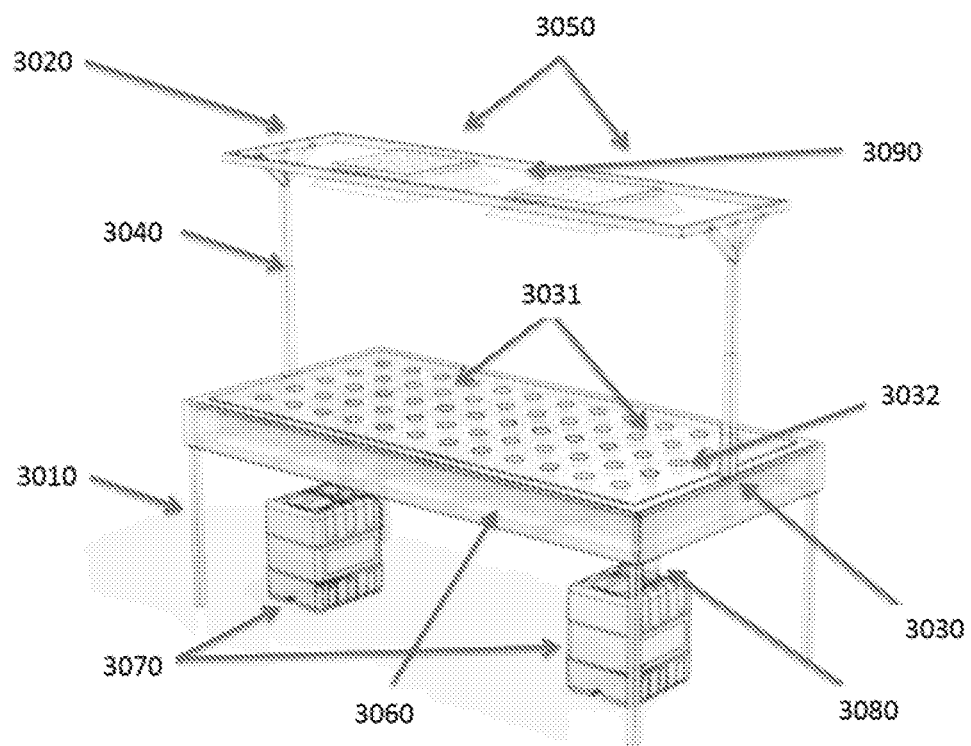
FIG. 3 is a schematic diagram of a depiction of one possible embodiment of the apparatus and system.

In another possible embodiment, a table-based design (see, e.g., FIG. 3) incorporates a core control system that automatically regulates certain variables, as explained herein, such as optimal nutrients and/or pH, for optimum plant growth with minimal user maintenance. The core control system is capable of powering a number of physical apparatus, such as several hydroponic growing systems/structures. The structure of the table 3060, in embodiments, utilizes an extruded aluminum frame that can be disassembled, although the frame can be made of any material sufficient to support the weight of the apparatus, including, but not limited to, plastic, wood, metal, or any other material. In aspects, the legs of the apparatus slot into a bracket in each of the four corners of the table 3010. The frame 3020 may slot into the bracket in the depicted grow area 3030. The preferably light frame has height or width that is variably adjustable, especially in terms of the height of the grow surface or the associated lights (see, e.g., 3040). This feature allows for the height or width of the grow area to be expanded to make room for larger plants or more plants, or made shorter or less wide for smaller or less plants. In aspects, the height and width are automatically adjusted by the system and apparatus when it recognizes a certain plant(s) being grown, such as based on input from a plug-in pod or pre-seeded tray as described herein, from the user, or from a camera and related software that are able to distinguish certain plants. The ability to manually raise, or have automatically raised, the height of the lights without having to make changes to the structure of the apparatus, enhances the versatility of the system without inconveniencing or requiring adjustment by the user. The frame, in aspects, allows for trellising and other additional support structures to enable the growth of wide, tall, or vine plants. The light frame holds, in one embodiment, two 300 W LED grow lights 3050. However, the system may use anywhere from 1 to 16 lights with intensity ranging from 50 to 1000 watts. In a preferred embodiment, the lights are full-spectrum to ensure the correct wavelengths for photosynthesis, thereby allowing for faster, more efficient, and/or more optimal plant growth. LED grow lights use a fraction of the energy required to generate a similar light-intensity using other artificial grow-lighting methods. In aspects, the lights are controlled by a timer within the core control system (see, e.g., FIG. 4); they may also be connected to a photo resistor that dims the light intensity when people are nearby or when there is adequate natural light. The lighting may also be controlled by the system, such as by a processor. For example, if a certain plant type is recognized by the system, such as due to user input or information received from a plug-in pod, a pre-seeded tray, a QR code, a bar code, camera vision, and/or machine learning, the system will automatically provide that plant type with optimal lighting conditions and/or optimal water content and nutrients. The system allows for some plants to receive a certain set of lighting conditions and other plants to receive other lighting conditions, based on what are optimal lighting conditions for those plants. The lighting may also be manually adjusted by a user physically, electronically, or via remote wireless input.

Figure 4:
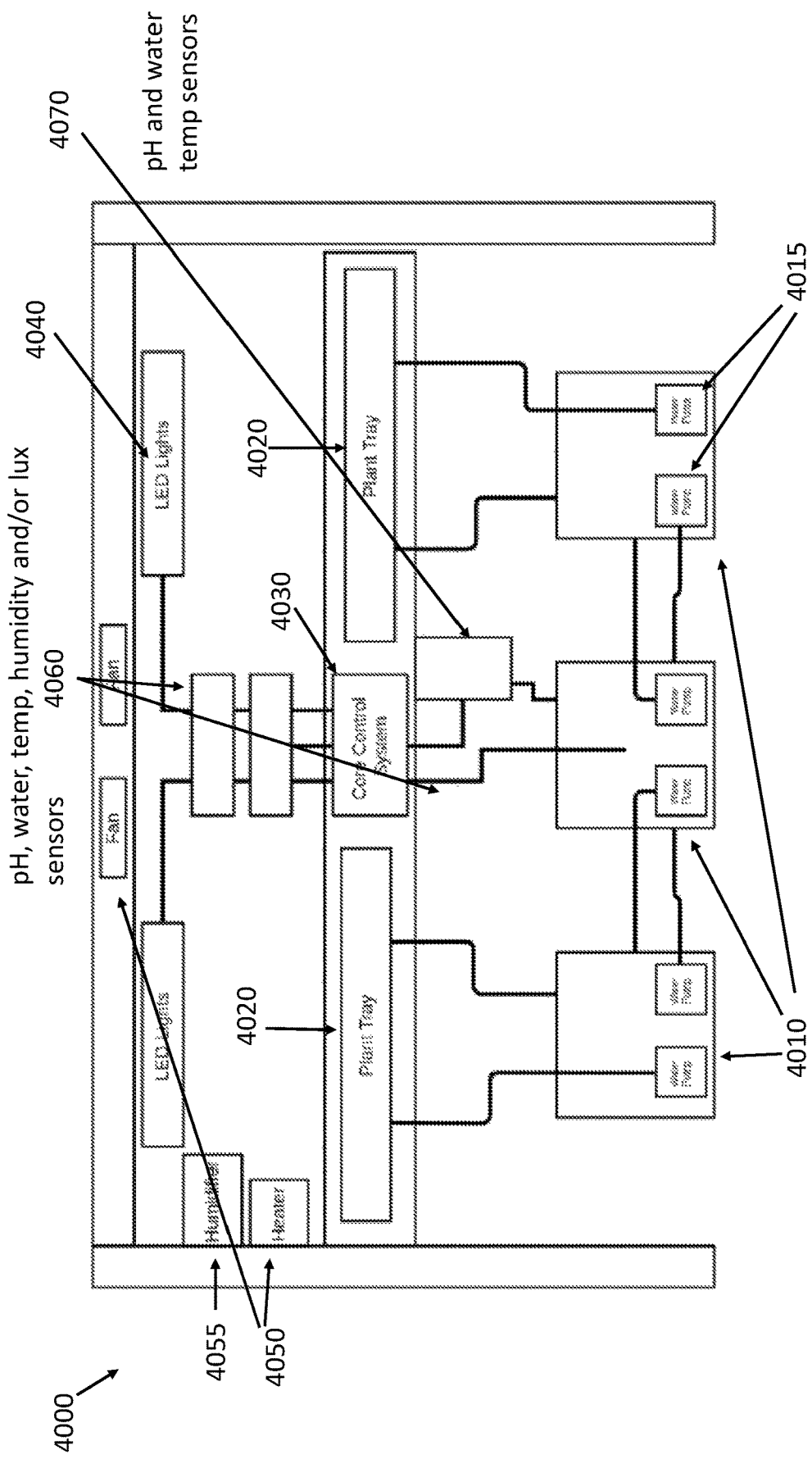
FIG. 4 is a schematic diagram of a depiction of one possible embodiment of the apparatus and system.

Similarly, the core control system 4030, which in cases is a computer processing unit, of the apparatus, for example as shown in FIG. 4, automatically regulates factors, including but not limited to, the pH, electrical conductivity, nutrient levels, temperature, humidity, water circulation, water aeration, carbon dioxide levels, air circulation, and/or light intensity or light wavelength. In aspects, the core control system is incorporated into or located near the structure of the table or the hydroponic growing apparatus/system taught herein; in other embodiments, it may be remote server based or in a remote electronic device, such as a computer or smartphone. The main circuit board may be located within or near the grow area. In embodiments, it may be wirelessly connected, thereby allowing users to remotely check, see, analyze, and/or monitor their crops and run experiments on growing conditions, change growing conditions, set growing conditions, learn about growing conditions, download growing conditions, search for growing conditions, and/or monitor growing conditions, such as via a remote electronic device (see, e.g., FIG. 8). In embodiments, the remote electronic device may be, for example, a computer processing unit, a server, a computer, a phone, a smartphone, a tablet, or other device capable of wireless communication. In embodiments, an air stone and/or water pump are housed within or near removable reservoirs (see, e.g., 3070). This feature enables water to be circulated into pre-seeded grow trays, plug-in pods, or other grow areas on automatic, regular, semi-regular, scheduled, periodic, manually-determined, and/or random cycles, which vary depending on plant type and/or stage of growth. The reservoirs may be easily accessible and removable allowing users to add water with minimal effort, and they may be connected via a piping system 3080 that allows for circulation to the pre-seeded grow trays, plug-in pods, or other grow areas, and for a sample solution to be read, monitored, and/or adjusted with the core control system or via user input.

Figure 6:
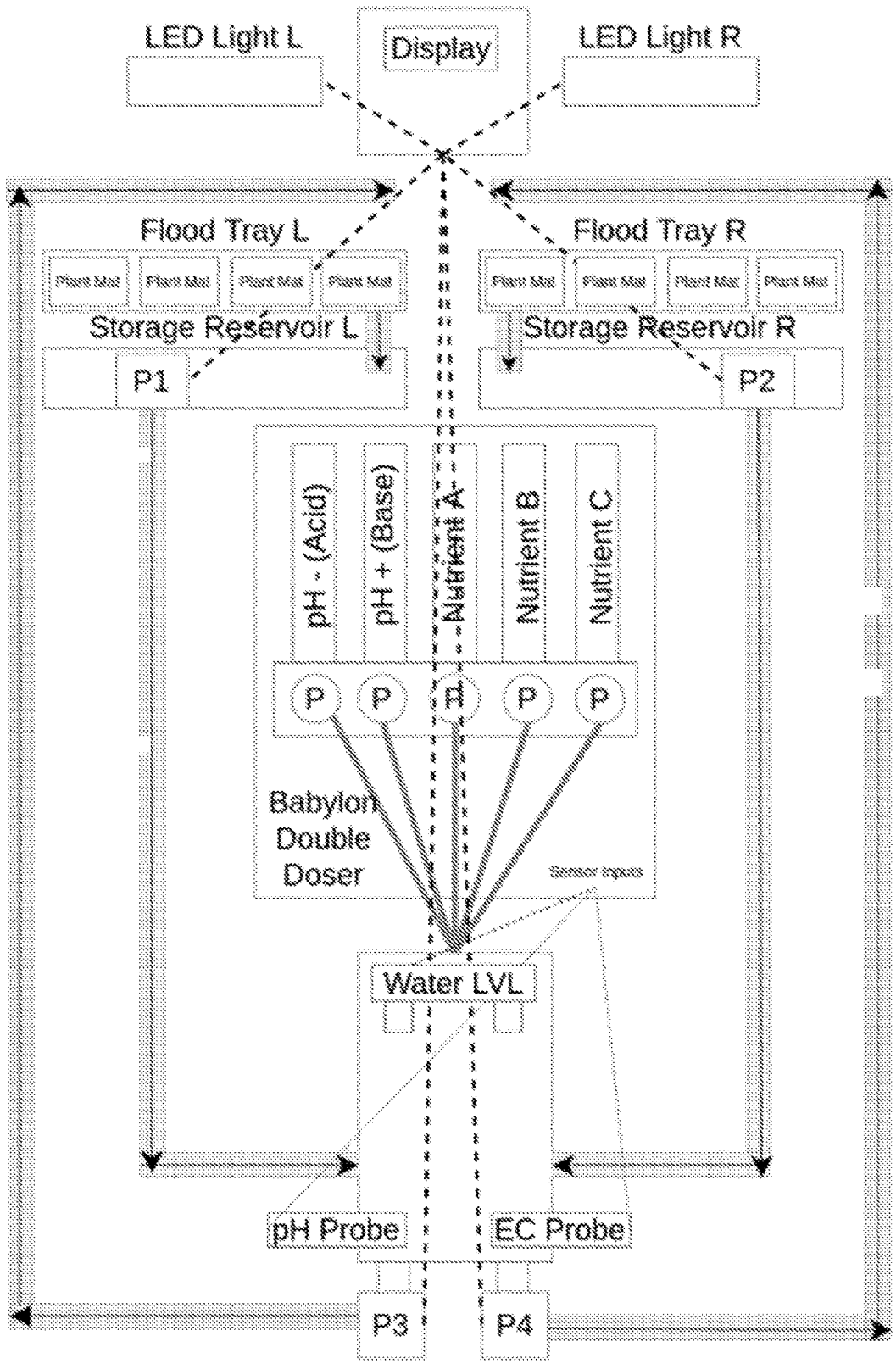
FIG. 6 is a schematic diagram of one possible embodiment of the apparatus and system.
Figure 7:
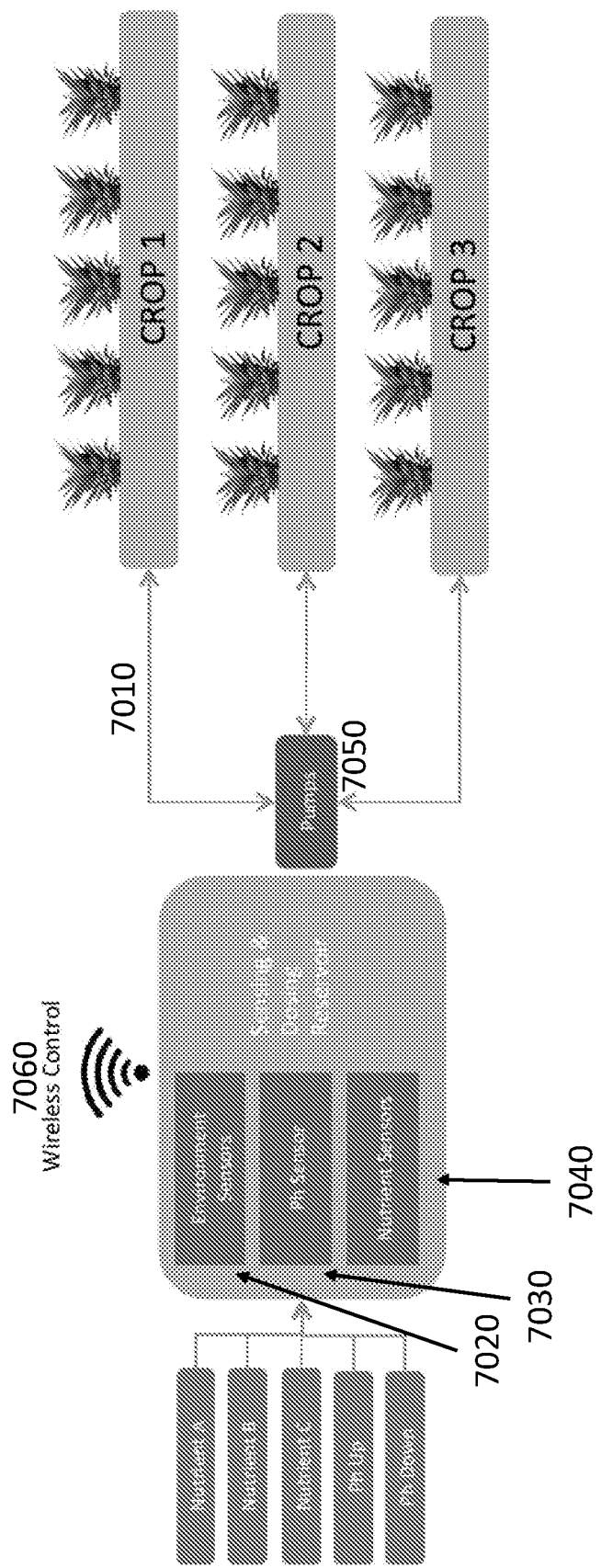
FIG. 7 is a schematic diagram of a depiction of one possible embodiment of the apparatus and system.

Each reservoir, in embodiments, is connected to a water-conditioning tank, or multi-doser, which contains, in certain embodiments, one or more pH sensor, one or more peristaltic pump pH adjuster, and/or one or more nutrient adjuster (see, e.g., FIGS. 6-7). In aspects, the conditioning tank comprises twelve solenoid valves to dispense adjusted solution to the pre-seeded grow trays. In embodiments, the system or device will allow for eight peristaltic pump pH adjusters and/or twelve solenoid valves, although the system may comprise one, two, three, four, five, six, and so on, peristaltic pump pH adjusters and/or solenoid valves. The multi-doser provides for a single measuring and adjusting unit that increases the efficiency of the system while removing the need for multiple units to do the same function for each reservoir. For example, the conditioning tank may automatically be provided instructions or commands from, for example, the core control system or a remote electronic device or server, to create an optimal water and/or nutrient condition for certain plants or plant life cycle based on the optimal, desired, or programmed growing conditions for those plants. For example, if the system recognizes a certain plant based on the type of pod or tray it is contained in, the system can automatically create an optimal concentration of, for example, water, nutrients, and pH to maximize growth and viability of that plant. Other conditions may be created for other types of plants in the same system if the system knows what those plants are. The system may recognize the plants based on user input, camera recognition, machine learning or, for example, identifying information from a plug-in pod or on a tray, such as a barcode, QR code, unique shape(s) and/or color(s), microchip, RFID, signal, or any other means known in the art for identification of an item. Consequently, the same apparatus can contain different types of plants, all of which are optimally treated, and which may be monitored and adjusted by the core control system and/or a user in real- or near real-time, if desired. According to a preferred embodiment, for example, multiple plants or trays served by multiple reservoirs can all be regulated by a single mixing chamber (i.e., multi-doser), which is connected to or in physical contact with each reservoir at all times or part of the time.

In embodiments, the system may be designed to operate using pre-seeded trays. The trays may comprise a tray of an inert growth medium (e.g., rockwool and peat/foam mixtures), seeds or plants, and/or a QR code (or other identifying means). The pre-seeded growth media may reduce the time and hassle of planting crops. Pairing these pre-seeded consumables with a QR code, for example, further simplifies the process to make it plug-and-play, in embodiments. The QR code can be scanned by a user (or automatically) into the system and the technology, such as a processor, can identify what type of plant(s) is being inserted and/or the stage of plant(s) lifecycle. The system may then allow the core control system to alert the user where to place the pre-seeded insert and assign a unique growth recipe to it, for example. This allows the system to determine pH and nutrient levels along with temperature, humidity, CO2, lighting, water cycle(s), and other factors to recreate optimal conditions for the plant(s) to grow. In embodiments, the QR codes or other recognition technology are essentially serial numbers for each individual consumable tray, so that sensor data with each individual crop(s) type grown within the system can be recorded, managed, monitored, and/or maintained. This innovation works in harmony with the multi-doser, allowing the system to run efficiently by harnessing the data collected to create a preferable user experience.

Such QR codes or other recognition techniques on the pre-seeded consumables allow the hydroponic system(s) to track the crops throughout the system(s). This allows growers to associate data on crop growth with individual plant(s) in the system allowing them to harness that data to improve efficiency, boost yields, and package the data with their crops to increase transparency throughout the supply chain. This adds value to the resultant produce as many groups come into contact with produce before it reaches the consumer's plate; each can scan the QR codes, for example, which allows for location tracking and sensor data to be packaged with produce from seed to sale.

Figure 10:
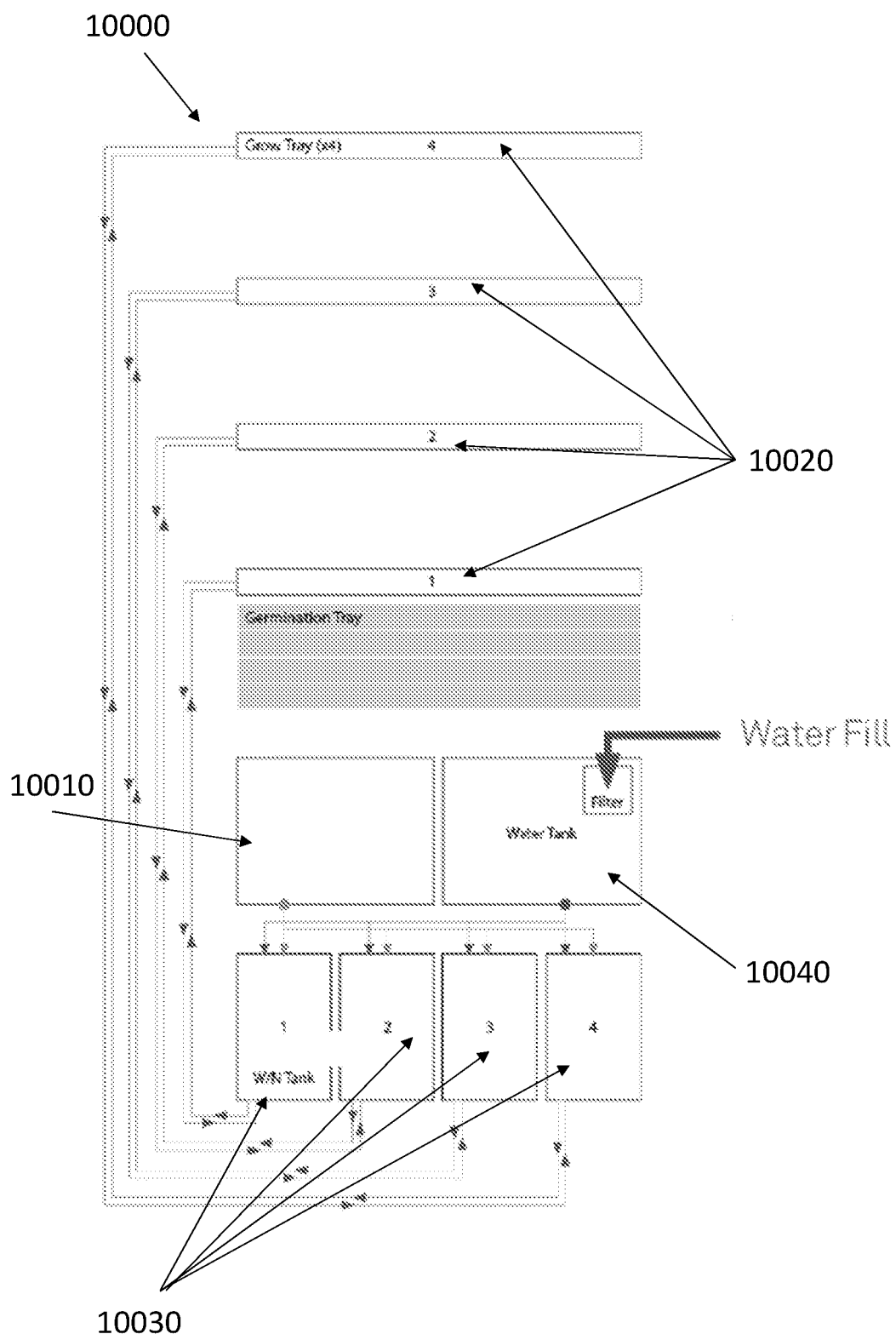
FIG. 10 is a schematic diagram of a depiction of one possible embodiment of the apparatus described herein; namely, the multi-doser as part of the system.

The multi-doser, as shown in FIG. 10 for example, automates nutrient dosing and pH adjustment for multiple reservoirs, growing zones, trays, or pods. This embodiment serves to reduce the cost of hydroponic growing since the system is capable of using one set of sensors for multiple crop varieties, trays, stages of growth, pods, etc. In embodiments, the multi-doser 10010 is capable of dosing crops on several different trays 10020, pods, or shelves in a cabinet-style (e.g., vertical) hydroponic growing system 10000. Accordingly, for example, shelves 10020 on a vertical system can have their own nutrient solution and pH on a shelf-by-shelf or area-by-area basis, which means a user can grow and/or manage different plants or different stages of growth on each shelf or area. This alleviates the need to buy separate dosers for each shelf, which is what is offered by the prior art. In other words, in preferred embodiments, a single multi-doser can regulate a plurality of reservoirs 10030 that sends water and nutrients to a plurality of plants, growing areas, and/or trays.

In FIG. 10, whereas in most automated dosing systems the sensors and dosers are located in the reservoir(s) 10030 that hold water, the current invention, in a preferred embodiment, provides for a single sensing and dosing chamber 10010 for one or more hydroponic growing apparatus (e.g., 10000). (In aspects, water may be located in the reservoir(s) 10030 and/or another water tank 10040.) For example, an overall hydroponic growing system may have several different tables or trays 10020 and a reservoir 10030 for each table or tray 10020. Sensors in or around the crops send information about the current growing conditions to the core control system (not pictured). Based on predetermined optimal, desired, programmed, and/or downloaded growing conditions, such as a growing recipe, the core control system can determine whether the growing conditions are non-optimal or not in comport with the predetermined optimal, desired, programmed, and/or downloaded growing conditions, and instruct the multi-doser to dose the crops with water and/or nutrients to bring the crop's growing conditions to an improved or optimal level. The multi-doser comprises a mixing chamber having sensors which mixes water, pH, nutrients and other growing factors based on instructions from the core control system or a user, or is capable of mixing through the process of circulation of liquid through the system, such as between a multi-doser and one or more reservoirs. The mixture will then be sent to the reservoir for the tray and pumped back to the tray or, in some aspects, it may be pumped directly to the tray from the multi-doser. This creates a dynamic feedback control loop whereby information from the crop is sent to the core control system, the core control system determines if changes need to be made to the crop's growing conditions, the core control system instructs the multi-doser what the plant needs and/or what mixture to create, the multi-doser mixes the water, nutrients, and other factors, which it sends to a reservoir for pumping the mixture back to the crop (or directly to the crop). Continually, periodically, or after the crop meets its optimal or desired growing conditions, the same multi-doser can be used for other reservoirs connected to other trays (or for pumping mixture(s) directly to other crops or trays). In embodiments, a valve may shut to a first reservoir and valve to a second reservoir may open and connect the same multi-doser that was previously serving the first reservoir. Accordingly, a system with several trays and/or reservoirs can be serviced by one apparatus, the multi-doser, for dosing plants with proper water, nutrients, and other factors.

In embodiments, a machine learning feedback loop may be utilized. In embodiments, data is collected and actuated upon multiple data points such as nutrient content, pH, humidity, temperature, and CO2 content. Suggested input values for these variables for each plant type may be found online or determined by a user, for example. A feedback loop may be achieved by incorporating camera vision and machine learning to determine outputs such as plant health, plant growth rate, etc. When such variables are measured, those outputs like plant health can be used to improve the way the system grows plants. On individual or a plurality of systems, the invention can adjust variable(s) to optimize plant growth, thus improving plant growth and other variable(s), such as speed of growth, taste, nutrition, etc. This may be used in conjunction with the multi-doser, because it allows for one or more separate growing zone, which can each be an individual trial in large scale tests.

In embodiments, the system could physically move the multi-doser to different reservoirs, or reservoirs could be moved to the multi-doser. A hybrid approach is also possible wherein each reservoir has sensors, but they share a similar multi-doser, or vice versa. The reservoirs could also be connected to the multi-doser by tubing, pipes, or similar mechanisms of connecting the multi-doser and reservoirs.

In another embodiment, when the pH and nutrient content of a reservoir must be checked, the current invention activates pumping water from that reservoir into the common mixing chamber (multi-doser) and back to its reservoir. (In another embodiment, water can come from a separate water tank.) As it circulates, it immerses the sensors in the multi-doser. Based on the data recorded by the sensors in the multi-doser, the system doses nutrients and pH solution directly into the mixing chamber. The circulation mixes the solution and the sensors monitor the water (or other liquid) and instruct the pumps when the desired nutrient concentration or pH has been achieved. This process is repeated until the pH and nutrient concentration comports with a pre-programmed growth recipe for a given reservoir or plant or tray, for example. The system then circulates the solution from the next reservoir in the same fashion, sensing, mixing, and repeating until the values reach the goals for that independent reservoir, which dose other plants in the hydroponic apparatus. The system cycles through and corrects the reservoirs on a periodic basis; this process can be repeated as frequently as a user of the system desires to maintain optimal conditions within the nutrient solution for any given crop, tray, pod, apparatus, or system. It may also be determined by the core control system.

Figure 11:
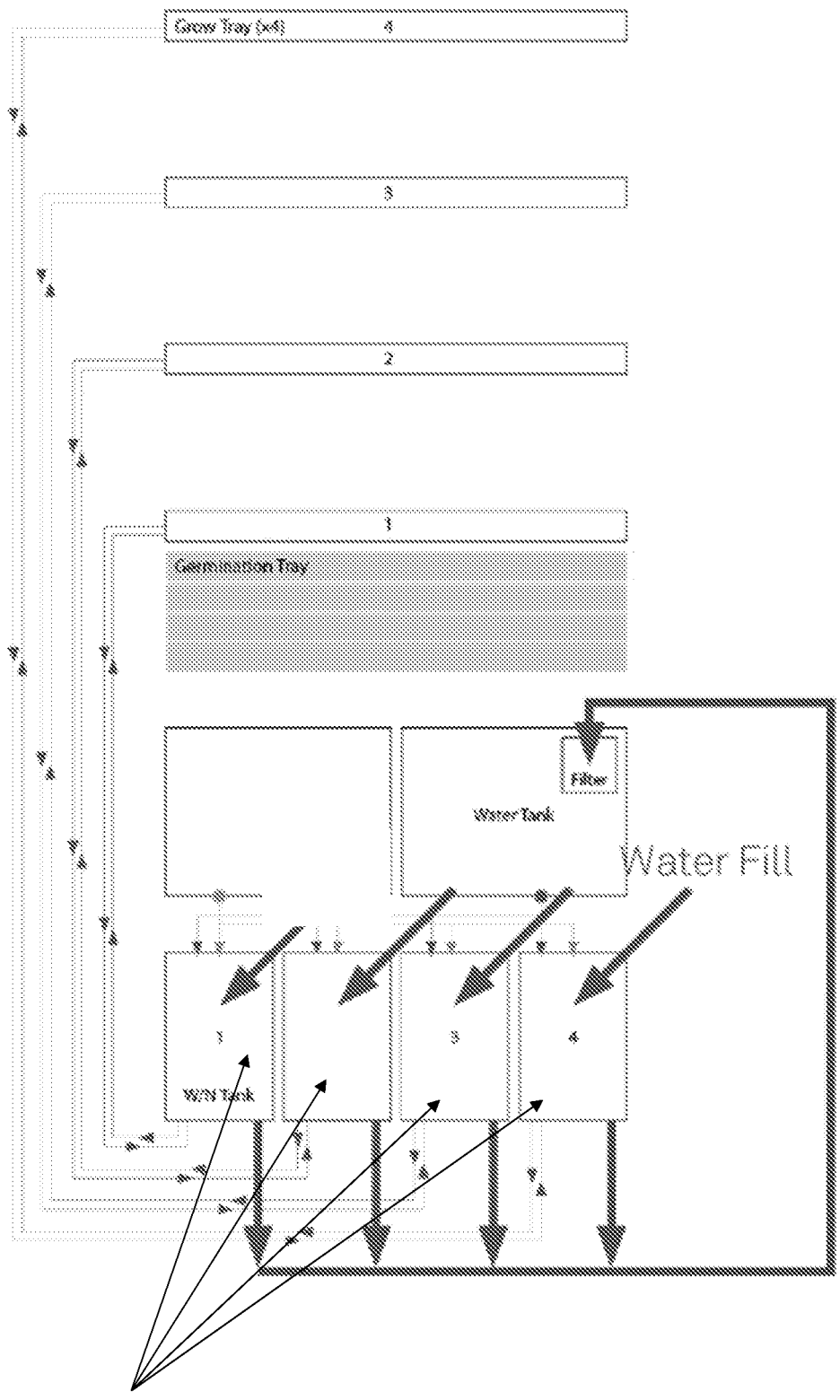
FIG. 11 is a schematic diagram of a depiction of one possible embodiment of the apparatus described herein; namely, the multi-doser as part of the system.
Figure 12:
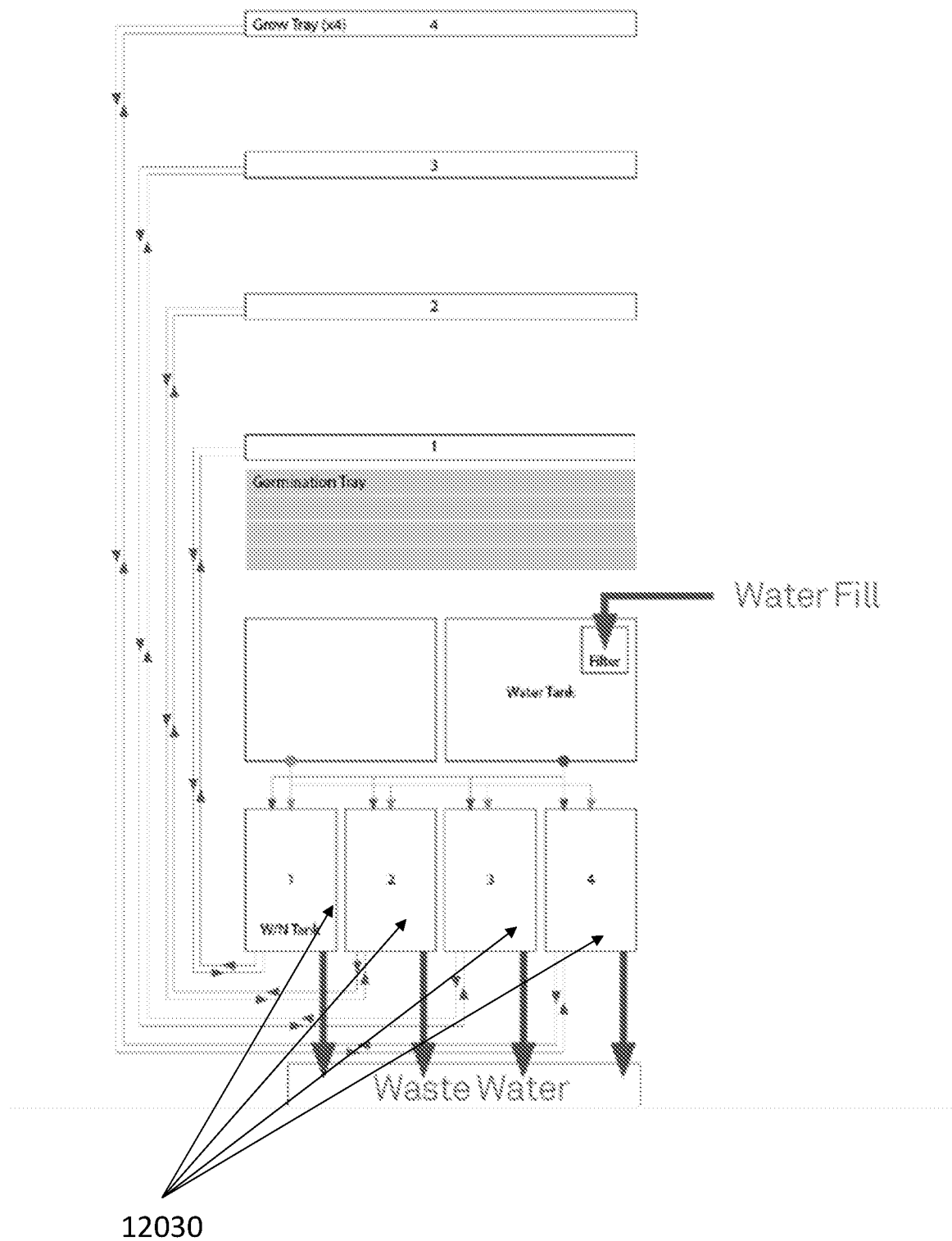
FIG. 12 is a schematic diagram of a depiction of one possible embodiment of the apparatus described herein; namely, the multi-doser as part of the system.

In embodiments, the conditioning tank is connected to the pH solution and nutrient solution via quick connect cartridges that can be replaced by the user. The system then monitors, adjusts, alerts, and otherwise takes care of technical measurements and necessary adjustments with or without user intervention. The system has the ability to be connected to a water line, thus removing the need for users to fill the reservoirs at regular or periodic intervals. For example, in FIG. 11, the reservoirs 11030 are filled with water and, in a preferred embodiment, the reservoirs do not need to be refilled during a plant life cycle. In FIG. 12, the reservoirs 12030 are filled with water and/or water may come from a separate tank or water source and, in a preferred embodiment, waste from the system flows to a drain, further simplifying using the overall system.

A main circuit board may be connected to another smaller environmental sensing board that may be embedded in the frame 3090. (In certain aspects, the system may provide for a separate board that handles AC or DC power switching or environment controlling.) The sensors may include any one or more of: Lux/Par, carbon dioxide, temperature, and/or humidity (see, e.g., FIG. 4). The readings from these sensors may be used manually or automatically to control an air-circulating fan, a humidifier, and/or LED grow lights that, in aspects, are embedded within the light frame or elsewhere on or near the apparatus. This enables the internal environment of the system to be manually or automatically regulated to provide the optimum conditions for plant growth.

The grow area may be divided into two or more separate grow trays 3031, tables, pods, or shelves (e.g., vertical shelves in, for example, a cabinet design), each connected to a reservoir, although they may each be coupled directly to the multi-doser, in some aspects. In other embodiments, the grow trays, tables, or shelves may comprise a vacuum formed polyethylene tray with a network of ridges to support the plant plug-in pods or plants and ensure equal, near-equal, or different distribution of solution within each grow tray, table, or shelf. The grow area may be divided into two or more sections to give the system greater flexibility and growing capabilities; this allows users to stratify the planting of crops. The stratification of crops allows users to have a constant, near-constant, automated, manual, scheduled, periodic, regular, or irregular supply of fresh produce by allowing one section to, for example, be in the early stages of growth while another section is ready for harvest. The divided grow area(s) can also allow users to grow crops that require a different balance of nutrients simultaneously. This provides the system with versatility not known in the prior art allowing users to grow almost any non-root fruit, vegetable, leafy green, or herb, by way of example. In some embodiments, plant holes 3032 can be opened or closed to make way for larger or smaller plants while ensuring the system remains airtight or near-airtight, if desired. This also allows users to gradually harvest some plants and close the plant holes gradually, making more room for plants to grow into.

Inputs for hydroponic plant growth, in addition to oxygen, carbon dioxide, biologic additives (e.g., bacterial fungicide), pH solution, and light, among other things, are mainly water and nutrients. Nutrients, in general, refers to elements such as calcium, magnesium, sodium, potassium, nitrogen, phosphorus, sulfur, chlorine, iron, manganese, copper, zinc, boron, and/or molybdenum that are available in a form that enables plant growth. These elements can be formulated into concentrated solutions that can be added to water in concentrations that can be easily absorbed by the plant roots. In the current invention, the nutrients are dispensed into, for example, a conditioning reservoir (e.g., multi-doser) based on electrical conductivity readings and the stage of plant growth. The nutrient solution may be supplied in quick-connect cartridges that may be retailed separately from the system.

According to the present invention, plants may be introduced into the system by pre-seeded trays tailored to work with the system. The plant trays may, in part, comprise a plastic mesh casing that contains an inert growth medium and seed(s), seedling(,) or young plant(s). The trays may be supplied to the users separately and come in a variety of options, including varying plant types. In a preferred embodiment, the trays/plants remain in place from germination to harvest.

The pre-seeded trays, in embodiments, or in other embodiments plug-in pods, may be placed or introduced into the apparatus at varying places in the system, such as on different vertically placed shelves, and different plants can be placed in different places but in the same apparatus. When the trays are identified by their plant or growth matrix, the system will then automatically adjust for optimal growing conditions for that type of plant as explained herein; consequently, parameters such as lighting and water/nutrient content may be automatically changed in order to increase the chances of optimal growth for a particular type of plant based on known conditions that are likely to improve the growth of that type of plant. The system has the capability of varying the light and/or water/nutrient content on a plant-by-plant or tray-by tray basis, for example, based on optimal growing conditions for that type of plant.

According to the current invention, the growing process is simplified from a user's perspective, enabling controlled plant cultivation to be accessible to users with little to no previous growing experience. When users purchase one of the systems, the system may arrive in an easy-to-assemble kit. Once assembled, in certain embodiments, users add in the necessary nutrient and pH quick connect cartridges that may last for multiple crop cycles. In certain embodiments, users can then insert plant pods, trays, tables, or shelves of their chosen variety. In aspects, once inserted into the system, the trays, for example, may be left until the seed has germinated and the first leaves appear. Users can then remove the plastic cap or covering or sheet to the pods or trays and leave the seedling to grow until harvest, or the pod or tray, for example, may be designed so that the user does not have to adjust the plug-in pod or pre-seeded tray once it is introduced into the system. In another embodiment, a user moves plant trays or pods from a dedicated germination area to a tray or other area where it will stay until harvest. Users can select the plant type using an Internet connected device such as mobile phone, tablet, or personal computer, or by catalogue or any other known method of ordering products. In a preferred embodiment, once the plant type is selected, the core control system will automatically regulate the conditions for plant growth from germination to harvest. Users are able to adjust the settings to conduct growing experiments, or otherwise affect growing conditions, if desired. The core control system may collect data throughout the growing cycle to optimize growing conditions for that apparatus or share with other apparatus via wireless connection, the internet, or the cloud, for example.

Turning now to a few additional figures, FIG. 4 shows one possible embodiment of the system. In this particular embodiment, starting from the bottom of the schematic and moving upwards, the apparatus 4000 comprises reservoirs 4010, in most cases containing mostly water, along with water pumps 4015 to pump the water or liquid to the plant growing trays 4020. In a preferred embodiment, a processor(s) in the core control system 4030 is receiving information from the plant trays, such as information about the condition of the growth medium or the plant(s). It may also receive information about plant type, condition, and state of growth from one or more plug-in pod(s), from a pre-seeded tray, from a sensor(s), from a camera(s), and/or from a user. The system creates a feedback loop wherein information received by the core control system sends commands to, for example, the water pump and the pH and/or nutrient dispensers 4070. Based on the information received from the plant trays, plug-in plant pod, other sensor(s), or a user, an optimal amount of water and nutrients are supplied to the plant and/or the growth medium. Similarly, light, temperature 4050, humidity 4055, and other conditions related to the plants may be monitored, controlled, and adjusted by the core control system, such as by using sensors 4060. In embodiments, the apparatus and underlying system will comprise, in aspects, LED lights 4040 for growing, although other types of lights may be used. Similarly, in FIG. 6, a system feedback loop is shown wherein probes or sensors receive information relating to the plant's condition as well as the condition in which it is growing and, based on that feedback, optimal water, nutrients, pH, and/or light are supplied or not supplied to the plant or its growth medium.

Figure 5:
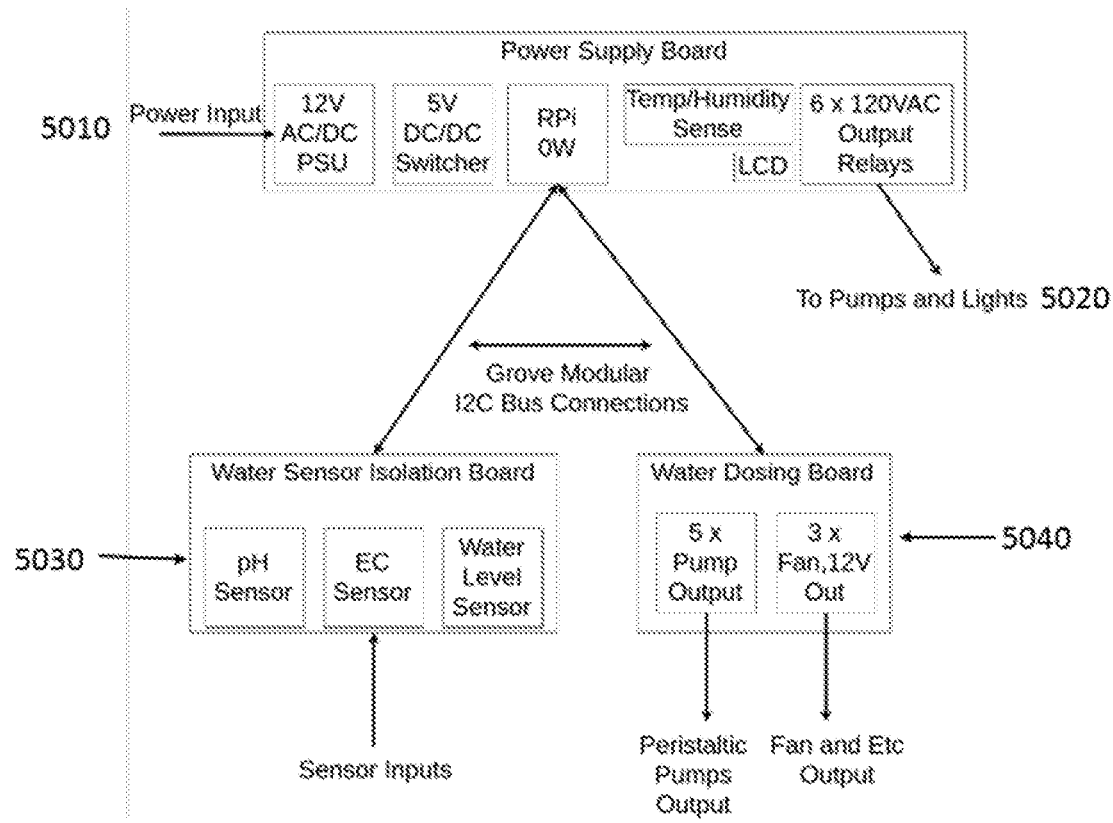
FIG. 5 is a schematic diagram of one possible embodiment of the system, including possible electrical aspects.

In FIG. 5, underlying electrical information of a particular embodiment of the invention is shown. In this example, power input 5010 is supplied to a power supply board that sends power to various components, for example the liquid pumps and LED lights 5020. Power is also sent to, for example, the sensors, a sensor isolation board 5030, and/or pumps, such as on a water dosing board 5040.

In FIG. 7, the schematic exemplifies one possible embodiment of a feedback loop 7010 wherein information from the crops, including directly from the crops and/or from environment sensors 7020, pH sensors 7030, and/or nutrient sensors 7040, by or through a processor or user input (for example), determines what is pumped 7050 back to the crops, including water, nutrients, and/or pH components, and also how the crops are treated in terms of light, temperature, and/or humidity. As indicated 7060, the information can be communicated wirelessly to a remote core control system, a computer, a phone, a tablet, the internet, and/or the cloud, for example.

Figure 8:
FIG. 8 is a diagram of a depiction of one possible embodiment of the apparatus and system as it relates to computer software application(s) and remote electronic device(s) associated with the apparatus and system.

FIG. 8 is a possible embodiment of a GUI and associated computer software application on a remote electronic device, such as a smartphone, wherein the system allows a guided growing experience 8010, remote crop monitoring 8020, including air/light/water/nutrient levels, live plant growth analytics 8030, recipe suggestions using, in whole or in part, the crops being grown 8040, and the capability of restocking plants or ordering new plants 8050, such as by ordering plug-in plant pods, individual plants, and/or pre-seeded plant trays.

Figure 9:
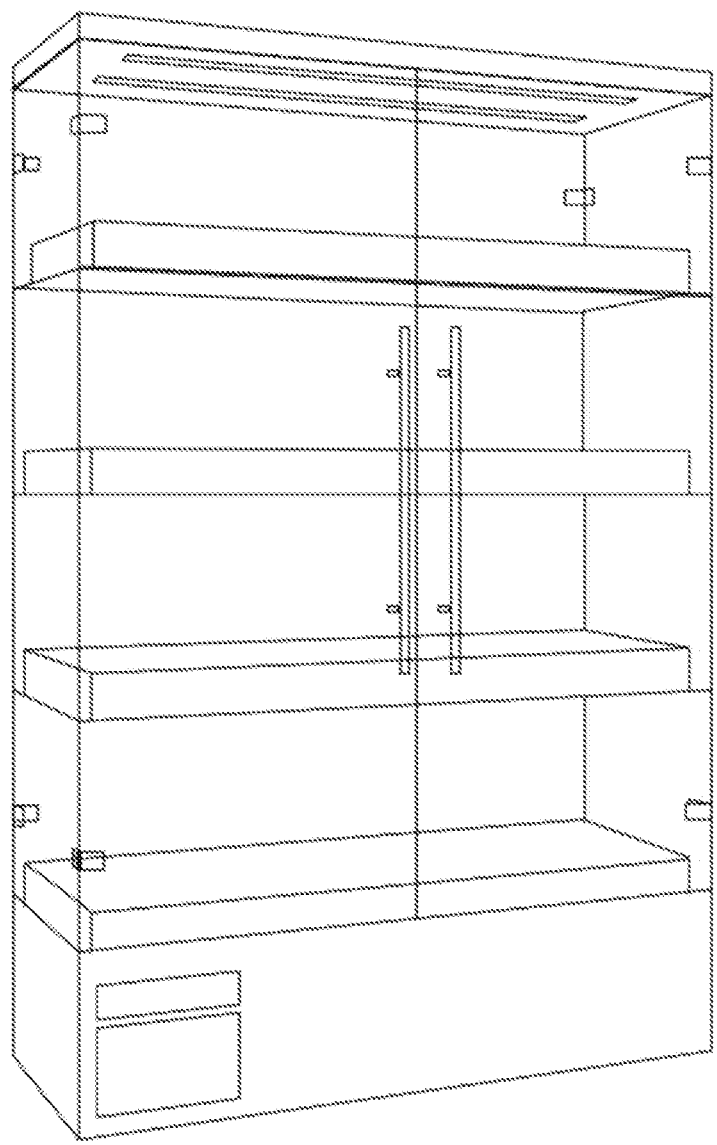
FIG. 9 is a schematic diagram of a depiction of one possible embodiment of the apparatus/device described herein.

FIG. 9 shows a possible embodiment wherein the growing areas, including pre-seeded trays, may be stacked vertically and encased as shelves in a cabinet, for example in a transparent, opaque, or semi-transparent cabinet.

Figure 13:
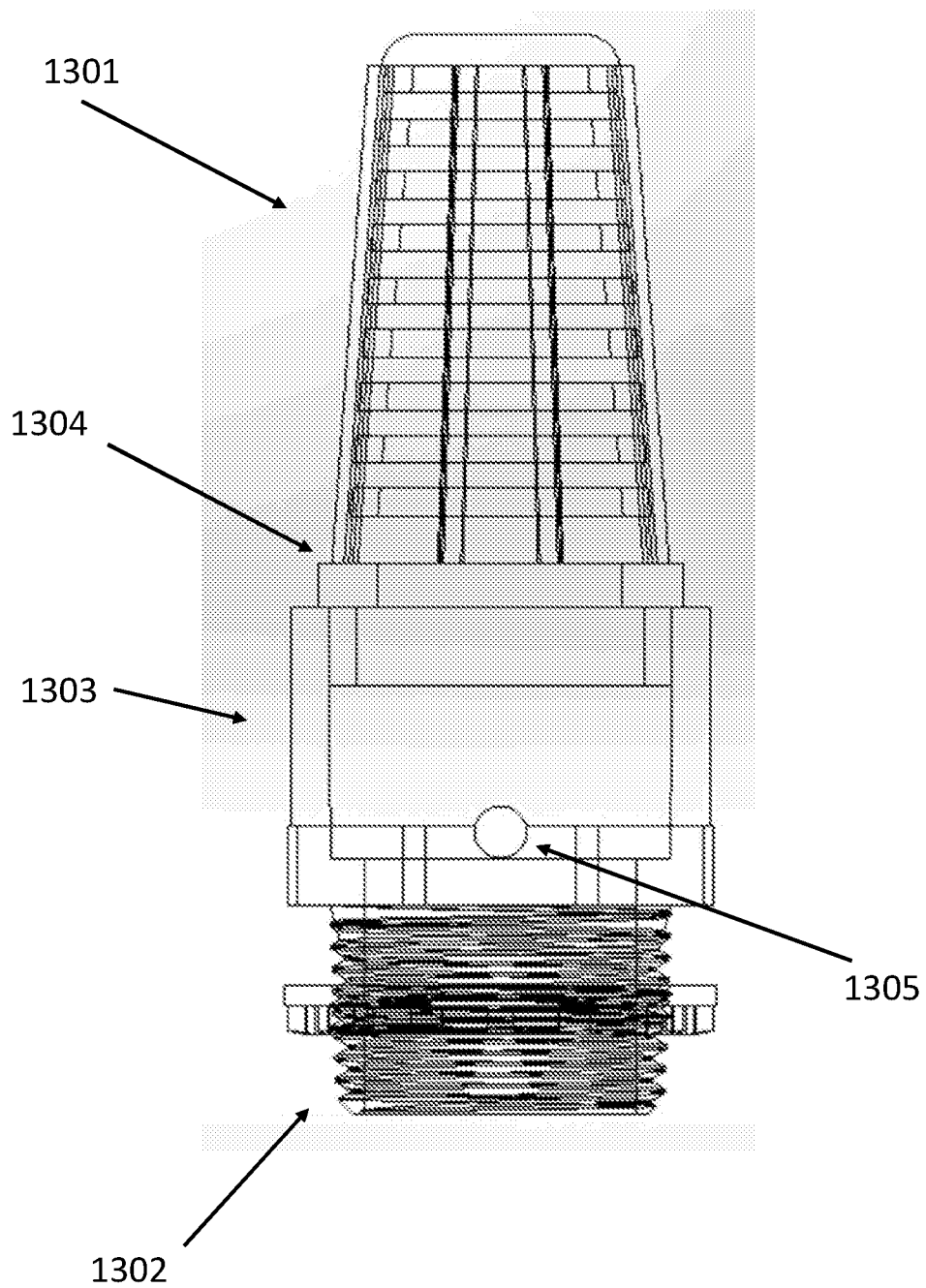
FIG. 13 is a schematic diagram of a depiction of one possible embodiment of the apparatus described herein; namely, a drain piece that is capable of setting water or other liquid levels/height within the tray, with a mesh filter on top in the aspect shown.

FIG. 13 shows a possible embodiment of the drain piece capable of setting water levels within a growing tray, including an optional mesh filter 1301 on top, in this particular aspect, to collect dirt, leaves, and other debris. The hollow threaded portion 1302 shows a possible way to connect the drain to or within a growing tray (such as within the open cavity of the growing tray), or to a pipe or tube, for draining purposes to, in aspects, a basin. In the portion 1303, the drain is able to control water level or nutrient solution level in the growing tray, because when the water level or nutrient solution level rises above the top of portion 1303 (noted as 1304 (where water or liquid enters the drain to keep levels steady)) it will drain down through 1303 and out the hollow threaded portion 1302 to, for example, a basin. This would occur, for example, when the pumps are turned on and water or other liquid is flowing into the growing tray, such as when the system is irrigating. When the pumps are not turned on, water or other liquid, in aspects, will gradually drain out through 1302 as water or other liquid enters the hole/opening 1305. This would occur, for example, when the pumps are not turned on, such as between irrigation cycles. By moving the opening at 1304 upwards or downwards vertically in portion 1303, for example, a user or the system can control the level or height of liquid solution or water in the growing tray.

Figure 14:
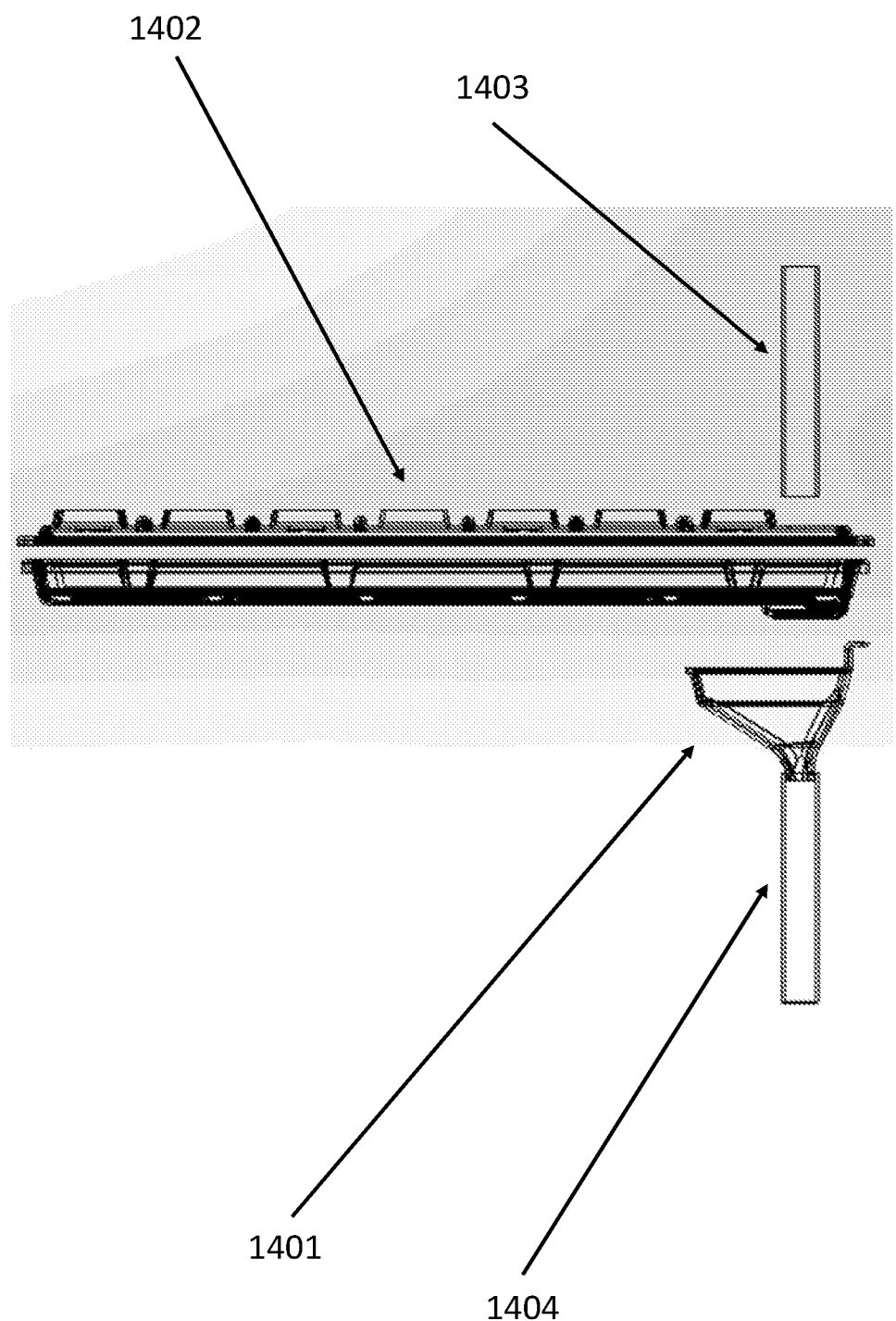
FIG. 14 is a schematic diagram of a depiction of one possible embodiment of the apparatus described herein; namely, a view depicting a possible embodiment of how the basin, tray, and drain tubes are placed relative to each other.
Figure 15:
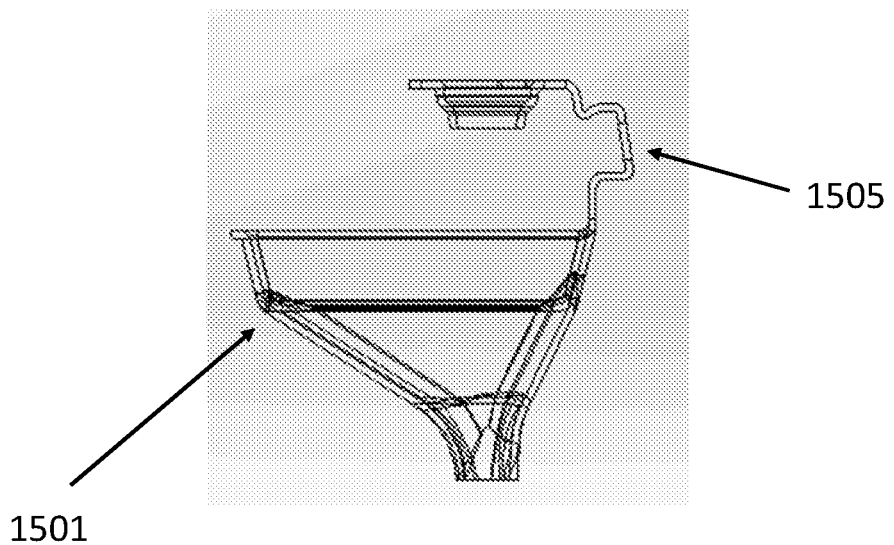
FIG. 15 is a schematic diagram of a depiction of one possible embodiment of the apparatus described herein.

FIG. 14 shows a possible embodiment of how the basin 1401, tray 1402, upper drain tube 1403, and lower drain tube 1404, are positioned relative to one another. As can be seen in FIG. 14, the drain tubes may be vertically stacked so that a drain tube 1403 coming from an upper growing tray flows to a growing tray 1402 underneath. In aspects, the upper drain tube 1403 sends water or nutrient solution from the growing tray above to a lower growing tray 1402, thereby supplying water or nutrient solution to the lower growing tray 1402. As the water or nutrient level rises in the growing tray, the drain aspect depicted in FIG. 13 may, in aspects, control the water or nutrient level in the growing tray 1402. For example, as the water or nutrient level rises, it will meet the upper portion of the drain 1304, causing the overflow water or nutrient solution to drain into the basin 1401. As also shown in FIG. 14, the basin 1401 catches the overflow water or nutrient solution, sends it through a lower drain tube 1404 to, in aspects, a lower growing tray, and the process starts over. FIG. 15 shows a possible embodiment of how the basin 1501 may be combined with a component 1505 that holds the drain tube from the basin above.

In this way, using the drain, basin, and draining tube, a drain in the growing tray comprises one or more upper openings and one or more lower openings, including holes, slits, or combinations thereof, wherein the one or more upper openings are capable of setting a water or other liquid height or level in the one or more trays, and wherein the one or more lower openings are capable of draining the water or other liquid, including between irrigation cycles.

In another possible embodiment, the system comprises a reservoir that has one or more features or performs one or more steps that extend its function beyond just storage of nutrient solution for the system. In aspects, for example, the reservoir may have a connected, attached, or molded section that stores nutrient concentrate as a liquid or in other containers such as bottles. In cases where the concentrate leaks, overflows, or splashes, it is contained or directed into the main cavity of the reservoir, instead of travelling outside of the system or to sections housing electronics or other sensitive components. The nutrient concentrate could also be located in the main cavity or mounted above the reservoir. The reservoir may also have a connected, attached, or molded section such as an upper shelf so that components such as valves, pumps, circuit boards, wires, sensors, or other sensitive components can be mounted or otherwise located away from or above any liquids in the reservoir. In this embodiment, this upper shelf of the reservoir would allow for any leaks from components located on the upper shelf to be contained or directed away from the shelf into another cavity of the reservoir. In another embodiment, the reservoir may have one or more of a lower shelf, where components such as sensors could be mounted or otherwise located in order to collect information such as the water level of the nutrient solution or whether the nutrient solution has reached an area or section of the reservoir.

In another embodiment, the reservoir is located on a cart, drawer, dolly, or other mechanism that allows for the reservoir to be mobile. In this embodiment, the reservoir may be totally or partially removed from the rest of the system so that, for example, it can be cleaned, drained, or inspected more easily. Additionally in this embodiment, tubing, wiring or cabling may be routed through a cable carrier or drag chain. In a possible embodiment, the reservoir has one or more features that are molded or attached which serve functions such as filtering water or nutrient solution or holding filter(s), sensor(s), pump(s), valve(s), cable(s), tube(s), or electronic component(s). A particular embodiment also has one or more features attached or molded to facilitate irrigation, structural integrity, or drainage.

In a further embodiment, the grow trays have features molded or attached, such as grooves or tabs, that allow them to slide into, grip, attach, or clip into the frame or structure of the system. They can be sized small enough to be easily removed or washed in a sink or dishwasher. In a particular embodiment, the grow trays have one or more features molded or attached which serve functions such as facilitating drainage, structural integrity, irrigation, filtering water or nutrient solution, or holding filter(s), lid(s), plant(s), plumbing component(s), sensor(s), cable(s), tube(s), or electronic component(s). One example is a drainage or overflow spout that ensures that if the drain is clogged or the tray otherwise overflows, that it is directed through the spout to be diverted to the appropriate location. Such a spout could also be used intentionally such as to tip the tray ahead of tray removal to reduce dripping when the tray is removed. The grow trays can also include features such as mounting points or physical or visual locating points for cameras or robotic components or machines to gather information and facilitate automation of activities such as harvesting or cleaning. In an additional embodiment, the grow trays may have attached or molded features to facilitate removal with reduced splashing or dripping, either in an automated way or through user interaction. Examples of such a feature include a valve to shut off or divert irrigation to the tray, a tab or plug that can stop drainage and dripping from the tray that is moved into place either by the user or automatically by being mechanically pressed or pulled into place by the act of removing the tray, or by electronic actuation such as by a valve, solenoid, or piston. In one embodiment, the grow trays have a drainage feature that allows for selection of the water high in the grow tray both during and between irrigation cycles. This feature relies on a large opening(s) to set the water height during irrigation, by allowing water to flow through the opening(s) once the water level reaches the desired height, which matches entirely or closely the flow rate of solution into the grow tray, holding the water height at the desired level. It further relies on a smaller opening(s) placed lower down than the larger hole to drain the tray slowly when the tray is not being irrigated. One possible example of this feature is a hollow cylinder whose height determines the water level during irrigation and which has small holes near the base to drain the water between irrigation cycles. Another example is a flat or bent "dam" that completely separates the drainage hole(s) with the rest of the tray where plants are located and water is entering the tray during irrigation. The height of the dam sets the water level during irrigation, and the dam may have one or more slits and/or holes to drain the water between irrigation cycles. Either example, and any other embodiment of the drainage feature, may be combined with a filter. Such a filter could envelop the whole drainage feature, or as another example, could be located at the overflow of the feature, such as a mesh extension of the cylinder drainage feature. In such a case, the height of the solid portion of the cylinder would set the water height during irrigation, and once the water reaches that height, it begins to pass through the filter to reach the drainage hole and flow out of the tray. In a further embodiment, this drainage feature is removable or replaceable to easily change the water height, clean a filter, or quickly drain the tray. In one possible embodiment, grow trays can have sensors attached or mounted such as pH, EC to measure those values in the solution in the tray, or mass scales to gather information on water volume or plant mass or water sensors, leak sensors, or moisture sensors to detect the presence of water. In one embodiment, one or more grow trays are placed or mounted on a carousel feature that rotates on a central axis so that a user can easily gain access to any tray without reaching.

In a further embodiment, the grow tray lids have features molded or attached, such as grooves or tabs, that allow them to slide into, grip, attach, or clip into a grow tray or frame or structure of the system. They can be sized small enough to be easily removed or washed in a sink or dishwasher. In a particular embodiment, the grow trays have one or more features molded or attached which serve functions such as facilitating drainage, structural integrity, irrigation, filtering water or nutrient solution, or holding filter(s), lid(s), plant(s), net cup(s), plumbing component(s), sensor(s), cable(s), tube(s), or electronic component(s). The grow tray lids can also include features such as mounting points or physical or visual locating points for cameras or robotic components or machines to gather information and facilitate automation of activities such as harvesting or cleaning. In one embodiment, there is an additional component, a blackout plug, that covers, plugs, or fills one or more plant holes in the grow tray lid, of which one or more can be used with a lid to stop light from contacting the nutrient solution in the tray during irrigation, diminishing algae growth. In a further embodiment, the lid has a feature such as a local low point which ensures that condensation and splashing accumulates or is directed into the tray as opposed to leaking outside of the tray. In one other embodiment, the lid has a vertical depth of >0.5" and an edge cutout so that when a tray or lid is inserted into the system, a stationary or otherwise mounted drainage tube may terminate below the top surface of the lid, limiting or preventing any gap between the drainage tube and the top of the lid which could lead to splashing. In another embodiment, the grow tray lid has configurable plant spacing. One possible mechanism is to use multiple layers or other surfaces that have the same or varying hole patterns. The holes may be round, square, or any other shape and depending on the position of each layer relative to the other(s), a different pattern of holes is visible or available for plants. One or more layers may be slid, rotated, or removed to change the hole pattern. In yet another embodiment, a similar system of separate lids or surfaces having the same or varying hole patterns may be slid, rotated, or otherwise moved relative to each other to grip or disengage plants or growth media.

In one embodiment, hyperspectral, infrared, or RGB camera(s) present can be used to gather information on user interactions, such as cleaning, harvesting, planting, or transplanting. In this embodiment, the cameras could also be used to gather information relating to the presence of insects, disease, fungus, contamination, or plant health, growth rate, canopy coverage, NDVI, photosynthetic activity, phytochemical production, flavor, yield, biomass, or stress. Such cameras could gather or exclude data in multiple light spectra or wavelengths by using multiple image sensors, or a manual, mechanical, or automated filter wheel or filter switch, where different filters can be used to isolate one or more specific spectrum bands for comparison or analysis. In another embodiment, a method of capturing image data of multiple light spectrum bands, such as infrared and red, and calculating trends or differences in the ratio of light in those bands over time, alone or in combination with other sensor information, can be used to calculate or estimate the presence of insects, disease, fungus, contamination, or plant health, growth rate, canopy coverage, NDVI, photosynthetic activity, phytochemical production, flavor, yield, biomass, or stress. In another embodiment, a method of calculating the statistical significance or correlation between current sensor values and/or estimates or calculations of the presence of insects, disease, fungus, contamination, or plant health, growth rate, canopy coverage, NDVI, photosynthetic activity, phytochemical production, flavor, or stress with future values of any of the same metrics can be used to predict and of those future values using current or past values. Using predictions of the previous method for, for example, yield, simulations can be run using many possible scenarios of sensor values or other information inferred through the use of cameras, to identify which scenario results in the highest value for that variable, yield. Relevant values for that scenario, such as pH, electrical conductivity, and/or temperature can then be incorporated into a growth recipe in order to optimize the environment that a system actuates towards for higher yields.

In another embodiment, there is a component, a "basin", which is able to catch water during irrigation to facilitate removal of grow tray(s) and/or grow tray lid(s) without unwanted splashing. When the grow trays are located in the system during irrigation, nutrient solution enters the tray from an irrigation tube, pipe, or gutter, then is transferred from the tray to the basin below, where it is directed to the next tray or accumulated and directed to the next set of trays. When the tray is not located in the system during irrigation, nutrient solution directly enters the basin from the irrigation tube, pipe, or gutter, where it is directed to the next tray(s). In one embodiment of the basin, it is sized to be approximately twice the size of the molded drainage recess in the grow tray, so that the tray can be moved forward, resulting in the nutrient solution flowing straight from the irrigation tube, pipe, or gutter into the basin, passing behind or to the side of the tray, while the tray continues to drain. This feature allows for a tray to be drained completely before being removed during irrigation. In another further embodiment, the basin may connect to the grow tray or grow tray lid by a quick connect or push connect mechanism. Such a mechanism allows fluid to pass between the basin and grow tray when connected through one or more access points, and block fluid from passing through the one or more access points when the tray is not connected. In this embodiment, the act of removing a tray could automatically disconnect it, or it could be disconnected by another manual mechanism such as a valve or button, or electromechanically by a mechanism such as a solenoid.

In one embodiment, there is a feature above or below the grow tray that supports the irrigation tube, pipe, or gutter. This feature can be a U-shaped clamp that is mounted with screws, bolts, or mechanical locking tabs, or can be a compliant clamp with two holes that fit and hold the irrigation tube, pipe, or gutter, that when pressed together, allow for the tube, pipe, or gutter to slide through and be removed from the system such as for cleaning. This supporting feature can also support the bottom end of the irrigation tube, pipe, or gutter, and regulate or control the flow or direction or shape of the nutrient solution stream such as to reduce splashing or optimize mixing of the solution within the grow tray. In one embodiment, this feature also has a surface that partially or completely covers holes in the grow tray or lid to block or contain splashing. In another embodiment, the basin and mounting feature are combined into a single piece.

In one embodiment, there are upper and lower "gutter" features that distribute and collect water to and from the growing trays. The upper gutter consists of a channel that is above or adjacent to the grow trays in which water flows through. In one possible configuration, there is a nozzle, drain, or notch in the side or bottom of the upper gutter for each tray, so that when water flows through the gutter, it is dispersed through the nozzle, drain, or notch into each tray. The upper gutter may also include a feature to set the water height during and between irrigation cycles, such as a gutter dam, which restricts water flow until the level reaches the height of the dam. Once the water level reaches the height of the dam, water flows over and is directed away, such as to the successive tier of trays, the lower gutter, or the reservoir. The gutter dam may also have one or more small holes and/or slits so that between irrigation cycles, water drains from the upper gutter to avoid standing water and algae growth. The lower gutter, in one embodiment, is a channel that collects water draining from one or more grow trays to direct the water to the next successive upper gutter, so that it can be distributed to the next successive grow tray(s). In a preferred embodiment, the upper and lower gutters are a single combined feature into which the grow trays are inserted into. In another preferred embodiment, the lower gutter combines features of the basin feature, such as one to block splashing, and is sized with extra room so that a tray(s) can be partially removed during irrigation so that the water exiting the upper gutter travels straight to the lower gutter and the tray may be still be drained into the lower gutter before removal. By using upper and lower gutters to distribute and collect nutrient solution, using a much larger number of tubes or pipes for irrigation can be avoided, increasing aesthetic value and lowering the number of parts that can be clogged and must be cleaned. In one embodiment, one or more of the bottom gutters, and particularly the lowest bottom gutter under the bottom tier of grow trays, has an additional gutter feature extending forward toward the front of the unit to direct water into the reservoir near the front of the unit. This allows for the reservoir, such as if mounted to a drawer or cart, may be partially or totally removed during irrigation. In another further embodiment, the upper and lower gutters, either separate or combined physically or by fluid access, connect to the grow tray or grow tray lid by a quick connect or push connect mechanism. Such a mechanism allows fluid to pass between the gutters and grow tray when connected through one or more access points, and block fluid from passing through the one or more access points when the tray is not connected. In this embodiment, the act of removing a tray could automatically disconnect it, or it could be disconnected by another manual mechanism such as a valve or button, or electromechanically by a mechanism such as a solenoid.

In hydroponics and indoor farming, there is a need for good airflow to regulate heat and moisture and mixing of the air around the plants and their roots. In one embodiment, many fans are mounted to one or more sides of an enclosed system, so that air is pushed in and pulled out in different locations, creating a crossflow past the plants. In another embodiment, one or more fans, such as cross flow fans, are mounted out of sight above or below the visible section of the system in which grow trays are located. The fan(s) push or pull air through a "distribution column," a column or pipe that is preferably located in the center of the system, oriented vertically. The distribution column may be clear, such as in a polycarbonate or acrylic material, to preserve aesthetic quality of a system, and may have holes or slits cut to direct air out of the column towards plants. In a preferred embodiment of the distribution column, there are at least two slits larger than 0.125" high and 0.25" wide directing air at each growing tray. In such embodiment, at least one is located to direct air at the plant canopy and at least one is directed lower towards the stem or roots of the plants. In another embodiment, there are multiple distinct channels within the distribution column or multiple distribution columns in order to vary airflow to different areas of the system or to different growing trays. In one embodiment, the sizes of the holes or slits can be varied to direct different amounts of airflow to different areas.

In one possible embodiment, there are multiple irrigation pumps to allow the system to irrigate two or more groups of trays independently. For example, one pump could water the bottom half of a system twice daily while another pump could water the top half three times daily. In a preferred embodiment, one pump with multiple valves such as an electronically actuated solenoid or ball valves arranged on its output can achieve a similar goal or effect. Each valve, when energized alongside the pump, opens an independent path for irrigation such as to an individual grow tray, group of grow trays, a path for mixing water in the reservoir, or a path to drain the reservoir. In one embodiment, there are sensors such as for pH or electrical conductivity mounted in the irrigation line before it is split off into the independent irrigation paths. A flow sensor can also be mounted inline to measure how much water is going to the grow trays or to monitor pump flow rate such as to determine if it or a valve is functioning properly.

In a possible embodiment, fiber optic sheets or cables are used to disperse light from a source such as the sun to plants on tiers of a hydroponic system. This allows for reduced electricity and other resource needs and requirements by reducing the need for artificial lighting in vertically tiered units that normally shade plants from sunlight.

In another possible embodiment, cameras are used to detect leaks by calculating or identifying a change in reflectivity or color such as in the base of the unit. In a further possible embodiment, ultrasound sensors are used to achieve a similar goal, by either collecting ultrasound data on a point source and measuring a difference in reflectance of ultrasound to identify the presence of water or by creating a two-dimensional mapping of ultrasound reflectance to detect and locate leaks across a larger area such as near the electronics or on LED bars.

In a further embodiment, a system may connect to the internet by tethering via Bluetooth® or radio to another internet connected device such as a mobile phone, or may be isolated from the internet and only connect to another device such as a mobile phone for updates such as to change a growth recipe.

In an additional embodiment, using locating visual features on a system as well as an identifying feature specific to each farm, and a camera such as on a mobile phone, overlays of information such as crop types, harvest dates, and notifications can be overlaid on top of the image of the farm. This allows a user to point their mobile device at a farm to gain information about its status or any actions that should be taken.

Further embodiments include using the processor or core control system to better manage the grow system, as well as ensure proper food safety growth and operation protocols. For example, varying embodiments above note the inclusion of numerous available sensors within the system, including by way example sensor 4070 of FIG. 4, sensor 5030 of FIG. 5, and sensors 7020-7040 of FIG. 7. These sensors operate to collect various data about the system, this data is usable to monitor growth and general operations.

Embodiments above note using the processing device and sensors to manage growth, hydration, and mixture levels. Further embodiments include using one or more of the sensors to monitor growth and system operation conditions relative to safety guidelines or protocols. By way of example, but not expressly limiting in nature, one embodiment can include using one or more cameras to visually monitor a plant, including detecting elements such as growth rate, color, presence of mold or other foreign element(s), etc. In another example, temperature sensors can detect if the operating temperature of the device is outside an acceptable operating range. In another example, a humidity sensor can detect if a humidity level is outside an acceptable operating range. In another example, the sensor or sensors can detect a leak in the operating of the system, for example via visual inspection, by detecting soil moisture rate(s), by monitoring water usage versus expected usage rates, or any other suitable technique as recognized by a skilled artisan.

The sensors are operative to detect operational data, consistent with sensor operations noted above.

The growing system includes numerous growing components, usable for hydroponic growing operations noted above. The growing components can include, but are not expressly limited to, items noted above.

The core processing system, in response to executable instructions, can therein monitor the operating conditions in an ongoing basis. Above descriptions include varying monitoring and adjustment operations, including for example modifying mixture and flow rates, as well as monitoring growth rates, controlling temperature and moisture, and generally optimizing the growth experience over prior art hydroponic systems.

Additionally, the core processing system uses the sensor data to improve food safety and related features. These food safety features can include, but are not limited to, failure to follow or properly follow cleaning protocols by either the system itself and/or the user operating the system, water temperature being too warm, improper draining, etc.

FIG. 16 illustrates one exemplary embodiment of a methodology, operatively performed by at least the processing device(s) in control of the growing system. In this embodiment, step 1602 is receiving sensor data from one or more sensors within the growing system. Using examples of sensors noted above, embodiments can include, but are not limited to, a temperature sensor measuring temperature inside the growing system or temperature of the soil or other elements, a camera capturing images of the plant(s) or other aspects of the growing system and performing image analysis, water flow sensors measuring or detecting leak(s) within the system, etc. In another embodiment, sensors included detecting user interaction with the system, including cleaning operations, therefore sensors can monitor and detect cleaning operations.

This sensor data is received by the processing device or devices of the core processing system. Step 1604 includes the processing device or devices comparing the sensor data against operating data protocols or other available information for operating conditions associated with the growing system. For example, if the sensor data relates to water usage, soil density or humidity, or related information, protocol data can include standard or acceptable operating ranges for current growing conditions associated with the plant or plants within the growing system. For example, if the sensor data relates to image(s) acquired from a camera, the operating data can include images of acceptable plant(s) at specific growth stages with the growth stages being known by the processing system based on operational functions described above.

Step 1606 is a decision step, determining if the comparison operation of step 1604 indicates an issue. In one embodiment, the issue may be a food safety issue, for example detecting that the plant(s) are not growing properly and could be harmful if consumed. In one embodiment, the issue may be an operational issue, for example noting that the growing system is not operating properly. Further examples of issue types, food safety, operational, or otherwise, are within the scope of the comparing operations, as recognized by a skilled artisan.

Where the resulting operation of step 1606 is that no issues are detected, the method reverts back to step 1602. In one embodiment, these operations are continuous operations being performed in an on-going or interval basis. For example, the growing system and processing device may run an hourly or daily check, where in other embodiments the checks can be continuous depending on available processing resources.

Where the resulting operation of step 1606 is in the affirmative, step 1608 is to perform one or more intervention operations. One embodiment can include modifying the growing parameters. For example, if the operational issue determines the plants are slightly behind their anticipated growth schedule, modifying the growing parameters can include increasing watering, nutrients, and light exposure time. For example, if the operational issue determines that a soil level is too moist, the growing parameters can be modified to reduce the watering schedule.

In another embodiment of step 1608, the system may notify the user. This step can include allowing or instructing the user to modify the operating parameters, or otherwise approve the growing system to change parameters. Where there may be a food safety or operational safety issue, the growing system can intervene and shut down or otherwise terminate specific growing functions. For example, if a moisture level, as detected by a humidity sensor, is too high and this causes mold to form on a plant, the system may terminate grow functions and instruct the user to remove and discard the unsafe food product, resuming grow functions when the system registers removal of the current tray and insertion of a new item.

In one embodiment, the present methodology is iterative. Therefore, the method reverts back to step 1602. For example, if the modification of the operational parameter is to increase the internal temperature, the method reverts back to step 1602 to continue to monitor the effectiveness of this solution. Therein, the present invention provides an automated self-control unit available to internally monitor and correct operations.

In addition, via the sensors or any other suitable processing technique, the growing system can thus monitor grow operations and user interactions. As based thereon, the system can monitor and assemble interaction and growth data. This data can include monitoring and calculating resource usage, such as electricity requirements, water usage, among other factors. This data can then be usable for generating sustainability or other feedback components. In one example, the system may generate a report or other form of output indicating the amount of power consumed, average production cost, and water consumption required for a particular grow, which can then be compared for sustainability relative to costs associated with purchasing product from a supermarket including freight costs and environmental impacts.

EXAMPLE 1

An apparatus of this invention was used as a functional growing appliance for home use. The system was used to grow basil, lettuce, spinach, kale, and bok choy. The system allowed for the year-round growth of fresh produce, which was consumed by the users.

EXAMPLE 2

An apparatus of this invention has been used as a growing appliance in a restaurant dynamic. The system was used to grow mint and parsley for use in, for example, drinks served to customers. The system was a productive appliance, and the restaurant was able to save money on at least two key ingredients.

EXAMPLE 3

An apparatus of this invention has been used as an interdisciplinary educational tool at the University of Virginia. The system is used as an individual means of teaching students about sustainable agricultural practices, plant biology, nutrition, cooking, and living a healthy lifestyle. The systems allow educators to provide an engaging experiment for students year round. The system has multiple features that align with the setup core curriculum for interdisciplinary education.

EXAMPLE 4

The core control system has been integrated into designs and apparatus relating to the current invention described herein. For example, it has been integrated into a vertical system that is attached to a wall or support structure enabling plant growth with more efficient space usage (see., e.g., FIG. 9). The core control system has also been tested on a larger fridge-styled system that contains multiple shelves for plants to grow on (see., e.g., FIG. 10). Accordingly, the growing surfaces can be stacked vertically or connected or placed horizontally to increase the growing area(s).

EXAMPLE 5

The core control system has been tested as a modular device that can be applied to any hydroponic apparatus. This would allow for hydroponic farming operations being automatically regulated via one modular control system. The applications for the core control system extend to the current system and as a retrofit for less advanced systems; the functionality of the system, in aspects, removes the need for multiple different components involved in regulating a hydroponic farming operation. This would make hydroponic growing methods more accessible by reducing the complexity of the system and lowering the price, thus removing many of the current barriers to entry.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of or" consist essentially of any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

REFERENCES

All references cited in this application are incorporated herein by reference.
U.S. Patent Publ. No. US20090223128A1 Hydroponic Monitor And Controller Apparatus with Network Connectivity and Remote Access
U.S. Patent Publ. No. US20060272210A1 Smart garden devices and methods for growing plants
U.S. Patent Publ. No. US20080276534A1 Devices and methods for growing plants by measuring liquid consumption
U.S. Pat. No. 8,443,546B1 Hydroponic plant growing system
U.S. Pat. No. 4,543,744A Plant growing chamber
U.S. Patent Publ. No. US20130019527A1 Mobile, Automatic Plant Growth System
U.S. Patent Publ. No. US20140318012A1 Plant Growing Device
China Patent No. CN205727249U Plant and plant pipe and plant system of planting U.S. Patent Publ. No. US20090288340A1 LED Grow Light Method and Apparatus China Patent No. CN205840428U A miniature farm for practical education
U.S. Pat. No. 4,932,158A Method and apparatus for hydroponic gardening
U.S. Pat. No. 6,178,692B1 Lighting system for use with a vertical growing column U.S. Pat. No. 5,555,676A Vertical planter apparatus and method

What is claimed is:
1. A hydroponic growing system including a cabinet structure and a processing device, the growing system comprising:
    a plurality of sensors disposed about the growing system and acquiring operational data from the growing system;
    a plurality of growing components for assisting growing functions within the growing system; and
    a plurality of executable instructions stored in a non-transitory readable computer medium such that the processing device, in response to the executable instructions:
        receives sensor data from the plurality of sensors;
        compares the sensor data against standard operating data protocols for operating conditions within the growing system;

detects if an operational risk exists based on the comparison of the sensor data; and if the operational safety risk is detected, modify at least one of the plurality of growing components.

2. The hydroponic growing system of claim 1, wherein the processing device, in response to the executable instructions:

if the operational safety risk is detected, notifying an end user via a wireless transmission of the operational safety risk.

3. The hydroponic growing system of claim 2 further comprising:

a remotely executable software application executing on a mobile computing device, the software application receiving the wireless transmission of the operational safety risk.

4. The hydroponic growing system of claim 3 further comprising:

the remotely executable software application receiving user input commands for modifying one or more of the growing components and transmitting the input commands to the processing device of the growing system.

5. The hydroponic growing system of claim 1, wherein the operational risk includes a food safety risk.

6. The hydroponic growing system of claim 5, the processing device in response to the executable instructions, operative to terminate growing operations associated with the food safety risk.

7. The hydroponic growing system of claim 1, wherein the operational risk includes an operational failure by at least one of the growing components, the processing device in response to the executable instructions, operative to terminate growing operations.

8. The hydroponic growing system of claim 1, wherein the operational risk includes an operational failure by at least one of the growing components, the processing device in response to the executable instructions, operative to modify growing instructions to the growing components.

9. The hydroponic growing system of claim 1, wherein at least one of the plurality of sensors include a camera capturing image content of plants being grown within the growing system, such that the image of the plants is usable as operational data and the processing device is operative to perform computer vision operations thereon.

10. The hydroponic growing system of claim 1, wherein the processing device, in response to the executable instructions, is further operative to:

review the sensor data to determine resource usage associated with the operations of the growing components; and generate sustainability feedback based thereon.

* * * * *